US009015823B2

(12) United States Patent
Koponen et al.

(10) Patent No.: US 9,015,823 B2
(45) Date of Patent: Apr. 21, 2015

(54) FIREWALLS IN LOGICAL NETWORKS

(71) Applicant: Nicira, Inc., Palo Alto, CA (US)

(72) Inventors: Teemu Koponen, San Francisco, CA (US); Ronghua Zhang, San Jose, CA (US); Pankaj Thakkar, Santa Clara, CA (US); Martin Casado, Portola Valley, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 13/678,504

(22) Filed: Nov. 15, 2012

(65) Prior Publication Data

US 2013/0125230 A1    May 16, 2013

Related U.S. Application Data

(60) Provisional application No. 61/560,279, filed on Nov. 15, 2011.

(51) Int. Cl.
*G06F 9/455*      (2006.01)
*G06F 15/177*     (2006.01)
(Continued)

(52) U.S. Cl.
CPC .......... *G06F 15/177* (2013.01); *H04L 41/0823* (2013.01); *G06F 9/455* (2013.01);
(Continued)

(58) Field of Classification Search
CPC ... G06F 21/55; H04L 63/102; H04L 63/0272; H04L 67/02
USPC ....................................... 726/1–3, 11–16, 27
See application file for complete search history.

(56) References Cited

U.S. PATENT DOCUMENTS 5,504,921 A    4/1996    Dev et al.
5,550,816 A    8/1996    Hardwick et al.
(Continued)

FOREIGN PATENT DOCUMENTS

EP    1653688       5/2006
JP    2003-124976   4/2003
(Continued)

OTHER PUBLICATIONS

Davie, B., et al., "A Stateless Transport Tunneling Protocol for Network Virtualization (STT)," Mar. 5, 2012, pp. 1-19, Nicira Networks, Inc., available at http://tools.ietf.org/html/draft-davie-stt-01.
(Continued)

*Primary Examiner* — Joseph P Hirl
*Assistant Examiner* — Kalish Bell
(74) *Attorney, Agent, or Firm* — Adeli LLP

(57) ABSTRACT

Some embodiments provide a method for configuring a logical firewall in a hosting system that includes a set of nodes. The logical firewall is part of a logical network that includes a set of logical forwarding elements. The method receives a configuration for the firewall that specifies packet processing rules for the firewall. The method identifies several of the nodes on which to implement the logical forwarding elements. The method distributes the firewall configuration for implementation on the identified nodes. At a node, the firewall of some embodiments receives a packet, from a managed switching element within the node, through a software port between the managed switching element and the distributed firewall application. The firewall determines whether to allow the packet based on the received configuration. When the packet is allowed, the firewall the packet back to the managed switching element through the software port.

22 Claims, 12 Drawing Sheets

(51) Int. Cl.
*G06F 21/55* (2013.01)
*H04L 12/24* (2006.01)
*H04L 12/28* (2006.01)
*H04L 12/46* (2006.01)
*H04L 29/06* (2006.01)
*H04L 29/12* (2006.01)
*H04L 12/741* (2013.01)

(52) U.S. Cl.
CPC ........ *H04L41/0803* (2013.01); *H04L 63/0218* (2013.01); *H04L 45/74* (2013.01); *H04L 12/2424* (2013.01); *H04L 41/0813* (2013.01); *H04L 41/0889* (2013.01)

(56) References Cited

U.S. PATENT DOCUMENTS

| | | |
|---|---|---|
| 5,751,967 A | 5/1998 | Raab et al. |
| 6,104,699 A | 8/2000 | Holender et al. |
| 6,512,745 B1 | 1/2003 | Abe et al. |
| 6,539,432 B1 | 3/2003 | Taguchi et al. |
| 6,680,934 B1 | 1/2004 | Cain |
| 6,785,843 B1 | 8/2004 | McRae et al. |
| 6,880,089 B1 | 4/2005 | Bommareddy et al. |
| 7,046,630 B2 | 5/2006 | Abe et al. |
| 7,055,173 B1 | 5/2006 | Chaganty et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,450,598 B2 | 11/2008 | Chen et al. |
| 7,478,173 B1 | 1/2009 | Delco |
| 7,555,002 B2 | 6/2009 | Arndt et al. |
| 7,606,260 B2 | 10/2009 | Oguchi et al. |
| 7,649,851 B2 | 1/2010 | Takashige et al. |
| 7,710,874 B2 | 5/2010 | Balakrishnan et al. |
| 7,730,486 B2 | 6/2010 | Herington |
| 7,764,599 B2 | 7/2010 | Doi et al. |
| 7,792,987 B1 | 9/2010 | Vohra et al. |
| 7,818,452 B2 | 10/2010 | Matthews et al. |
| 7,826,482 B1 | 11/2010 | Minei et al. |
| 7,856,549 B2 | 12/2010 | Wheeler |
| 7,885,276 B1 | 2/2011 | Lin |
| 7,925,850 B1 | 4/2011 | Waldspurger et al. |
| 7,936,770 B1 | 5/2011 | Frattura et al. |
| 7,948,986 B1 | 5/2011 | Ghosh et al. |
| 7,995,483 B1 | 8/2011 | Bayar et al. |
| 8,027,354 B1 | 9/2011 | Portolani et al. |
| 8,031,633 B2 | 10/2011 | Bueno et al. |
| 8,054,832 B1 | 11/2011 | Shukla et al. |
| 8,060,875 B1 | 11/2011 | Lambeth |
| 8,199,750 B1 | 6/2012 | Schultz et al. |
| 8,265,075 B2 | 9/2012 | Pandey |
| 8,339,959 B1 | 12/2012 | Moisand et al. |
| 8,339,994 B2 | 12/2012 | Gnanasekaran et al. |
| 8,611,351 B2 | 12/2013 | Gooch et al. |
| 2002/0093952 A1 | 7/2002 | Gonda |
| 2002/0194369 A1 | 12/2002 | Rawlins et al. |
| 2003/0069972 A1 | 4/2003 | Yoshimura et al. |
| 2003/0093481 A1 | 5/2003 | Mitchell et al. |
| 2004/0049701 A1 | 3/2004 | Le Pennec et al. |
| 2004/0054793 A1 | 3/2004 | Coleman |
| 2004/0098505 A1 | 5/2004 | Clemmensen |
| 2005/0018669 A1 | 1/2005 | Arndt et al. |
| 2005/0021683 A1 | 1/2005 | Newton et al. |
| 2005/0050377 A1 | 3/2005 | Chan et al. |
| 2006/0092976 A1 | 5/2006 | Lakshman et al. |
| 2006/0221961 A1 | 10/2006 | Basso et al. |
| 2007/0233838 A1 | 10/2007 | Takamoto et al. |
| 2007/0266433 A1 | 11/2007 | Moore |
| 2007/0283348 A1 | 12/2007 | White |
| 2007/0286185 A1 | 12/2007 | Eriksson et al. |
| 2008/0002579 A1 | 1/2008 | Lindholm et al. |
| 2008/0005293 A1 | 1/2008 | Bhargava et al. |
| 2008/0049621 A1 | 2/2008 | McGuire et al. |
| 2008/0072305 A1 | 3/2008 | Casado et al. |
| 2008/0163207 A1 | 7/2008 | Reumann et al. |
| 2008/0189769 A1 | 8/2008 | Casado et al. |
| 2008/0196100 A1 | 8/2008 | Madhavan et al. |
| 2008/0225853 A1 | 9/2008 | Melman et al. |
| 2008/0240122 A1 | 10/2008 | Richardson et al. |
| 2009/0031041 A1 | 1/2009 | Clemmensen |
| 2009/0063750 A1 | 3/2009 | Dow |
| 2009/0083445 A1 | 3/2009 | Ganga |
| 2009/0122710 A1 | 5/2009 | Bar-Tor et al. |
| 2009/0129271 A1 | 5/2009 | Ramankutty et al. |
| 2009/0150527 A1 | 6/2009 | Tripathi et al. |
| 2009/0161547 A1 | 6/2009 | Riddle et al. |
| 2009/0240924 A1 | 9/2009 | Yasaki et al. |
| 2009/0249470 A1 | 10/2009 | Litvin et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0046530 A1 | 2/2010 | Hautakorpi et al. |
| 2010/0046531 A1 | 2/2010 | Louati et al. |
| 2010/0115101 A1 | 5/2010 | Lain et al. |
| 2010/0125667 A1* | 5/2010 | Soundararajan ............... 709/227 |
| 2010/0131636 A1 | 5/2010 | Suri et al. |
| 2010/0138830 A1 | 6/2010 | Astete et al. |
| 2010/0153554 A1 | 6/2010 | Anschutz et al. |
| 2010/0165877 A1 | 7/2010 | Shukla et al. |
| 2010/0214949 A1 | 8/2010 | Smith et al. |
| 2010/0257263 A1 | 10/2010 | Casado et al. |
| 2011/0085559 A1 | 4/2011 | Chung et al. |
| 2011/0225594 A1 | 9/2011 | Iyengar et al. |
| 2011/0261825 A1 | 10/2011 | Ichino |
| 2011/0310899 A1 | 12/2011 | Alkhatib et al. |
| 2012/0014386 A1 | 1/2012 | Xiong et al. |
| 2012/0246637 A1* | 9/2012 | Kreeger et al. ................... 718/1 |
| 2013/0058350 A1* | 3/2013 | Fulton ........................ 370/400 |
| 2013/0073743 A1* | 3/2013 | Ramasamy et al. .......... 709/238 |
| 2013/0121209 A1 | 5/2013 | Padmanabhan et al. |
| 2013/0125120 A1 | 5/2013 | Zhang et al. |
| 2013/0128891 A1 | 5/2013 | Koponen et al. |
| 2013/0132531 A1 | 5/2013 | Koponen et al. |
| 2013/0132532 A1 | 5/2013 | Zhang et al. |
| 2013/0132533 A1 | 5/2013 | Padmanabhan et al. |
| 2013/0132536 A1 | 5/2013 | Zhang et al. |
| 2013/0332619 A1* | 12/2013 | Xie et al. ...................... 709/230 |

FOREIGN PATENT DOCUMENTS

| | | |
|---|---|---|
| JP | 2003-318949 | 11/2003 |
| WO | WO 2005/112390 | 11/2005 |
| WO | WO 2008/095010 | 8/2008 |
| WO | WO 2013/074827 | 5/2013 |
| WO | WO 2013/074828 | 5/2013 |
| WO | WO 2013/074831 | 5/2013 |
| WO | WO 2013/074842 | 5/2013 |
| WO | WO 2013/074844 | 5/2013 |
| WO | WO 2013/074847 | 5/2013 |
| WO | WO 2013/074855 | 5/2013 |

OTHER PUBLICATIONS

Foster, Nate, et al., "Frenetic: A Network Programming Language," ICFP '11, Sep. 19-21, 2011, 13 pages, Tokyo, Japan.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 1 of 2, pp. 1-79.

Laurent, Ciavaglia, et al., "Autonomic network engineering for the self-managing Future Internet (AFI); Generic Autonomic Network Architecture (An Architectural Reference Model for Autonomic Networking, Cognitive Networking and Self-Management)," Apr. 2013, ETSI, France, Part 2 of 2, pp. 80-167.

Loo, Boon Thau, et al., "Declarative Routing: Extensible Routing with Declarative Queries," In Proc. of SIGCOMM, Aug. 21-26, 2005, 14 pages, Philadelphia, PA, USA.

Loo, Boon Thau, et al., "Implementing Declarative Overlays," In Proc. of SOSP, Oct. 2005, 16 pages, Brighton, UK.

(56) References Cited

OTHER PUBLICATIONS

Sekar, Vyas, et al., "Design and Implementation of a Consolidated Middlebox Architecture," In Proc. of NSDI, Month Unknown, 2012, 14 pages.
Shenker, Scott, et al., "The Future of Networking, and the Past of Protocols," Dec. 2, 2011, pp. 1-30, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.
Andersen, David, et al., "Resilient Overlay Networks," Oct. 2001, 15 pages, 18th ACM Symp. On Operating Systems Principles (SOSP), Banff, Canada, ACM.
Anderson, Thomas, et al., "Overcoming the Internet Impasse through Virtualization," Apr. 2005, pp. 34-41, IEEE Computer Society.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "Cisco Nexis 1000V Series Switches," Date Unknown but prior to Jul. 29, 2010, 2 pages, Cisco Systems, Inc., http://web.archive.org/web/20100729045626/http://www.cisco.com/en/US/Products/ps9902/index.html.
Author Unknown, "Cisco VN-Link: Virtualization-Aware Networking," Month Unknown, 2009, 10 pages, Cisco Systems, Inc.
Author Unknown, "Cisco VN-Link: Virtual Machine-Aware Networking," Apr. 2009, 2 pages, Cisco Systems, Inc.
Author Unknown, "Intel 82599 10 Gigabit Ethernet Controller: Datasheet, Revision: 2.73," Dec. 2011, 930 pages, Intel Corporation.
Author Unknown, "Virtual Machine Device Queues," White Paper, Month Unknown, 2007, pp. 1-4, Intel Corporation.
Author Unknown, "VMare for Linux Networking Support," Date Unknown but prior to Nov. 17, 1999, pp. 1-5, VMWare, Inc.
Barham, Paul, et al., "Xen and the Art of Virtualization," Oct. 19-22, 2003, pp. 1-14, SOSP'03, Bolton Landing New York, USA.
Cai, Zheng, et al., "The Preliminary Design and Implementation of the Maestro Network Control Platform," Oct. 1, 2008, pp. 1-17, NSF.
Casado, Martin, et al. "Ethane: Taking Control of the Enterprise," SIGCOMM'07, Aug. 27-31, 2007, pp. 1-12, ACM, Kyoto, Japan.
Casado, Martin, et al., "Rethinking Packet Forwarding Hardware," Seventh ACM SIGCOMM' HotNets Workshop, Nov. 2008, pp. 1-6, ACM.
Casado, Martin, et al., "SANE: A Protection Architecture for Enterprise Networks," In proceedings of Usenix Security, Aug. 2006, pp. 1-15.
Casado, Martin, et al., "Scaling Out: Network Virtualization Revisited," Month Unknown, 2010, pp. 1-8.
Casado, Martin, et al., "Virtualizing the Network Forwarding Plane," Dec. 2010, pp. 1-6.
Congdon, Paul, "Virtual Ethernet Port Aggregator Standards body Discussion," Nov. 10, 2008, pp. 1-26, HP.
Davoli, Renzo, "VDE: Virtual Distributed Ethernet," TRIDENTCOM'05, Feb. 23-25, 2005, pp. 1-8, IEEE Computer Society.
Dixon, Colin, et al., "An End to the Middle," Proceedings of the 12th conference on Hot topics in operating systems USENIX Association, May 2009, pp. 1-5, Berkeley, CA, USA.

Dobrescu, Mihai, et al., "RouteBricks: Exploiting Parallelism To Scale Software Routers," SOSP'09, Proceedings of the ACM SIGOPS 22nd Symposium on Operating Systems Principles, Oct. 2009, pp. 1-17, ACM New York, NY.
Farrel, A., "A Path Computation Element (PCS)—Based Architecture," Aug. 2006, pp. 1-41, RFC 4655.
Fischer, Anna, "[PATCH][RFC] net/bridge: add basic VEPA support," Jun. 2009, pp. 1-5, GMANE Org.
Garfinkel, Tal, et al., "A Virtual Machine Introspection Based Architecture for Intrusion Detection," In Proc. Network and Distributed Systems Security Symposium, Feb. 2003, pp. 1-16.
Greenberg, Albert, et al., "A Clean Slate 4D Approach to Network Control and Management," ACM SIGCOMM Computer Communication Review, Oct. 2005, 12 pages, vol. 35, No. 5.
Greenberg, Albert, et al., "VL2: A Scalable and Flexible Data Center Network," SIGCOMM'09, Aug. 17-21, 2009, pp. 51-62, ACM, Barcelona, Spain.
Greenhalgh, Adam, et al., "Flow Processing and The Rise of Commodity Network Hardware," ACM SIGCOMM Computer Communication Review, Apr. 2009, pp. 21-26, vol. 39, No. 2.
Gude, Natasha, et al., "NOX: Towards an Operating System for Networks," ACM SIGCOMM Computer communication Review, Jul. 2008, pp. 105-110, vol. 38, No. 3.
Guo, Chanxiong, et al., "BCube: A High Performance, Server-centric Network Architecture for Modular Data Centers," SIGCOMM'09, Aug. 17-21, 2009, pp. 1-12, ACM, Barcelona, Spain.
Hinrichs, Timothy L., et al., "Practical Declarative Network Management," WREN'09, Aug. 21, 2009, pp. 1-10, Barcelona, Spain.
Ioannidis, Sotiris, et al., "Implementing a Distributed Firewall," CCS'00, Month Unknown, 2000, pp. 1-10, ACM, Athens, Greece.
Joseph, Dilip, et al., "A Policy-aware Switching Layer for Date Centers," Jun. 24, 2008, 26 pages, Electrical Engineering and Computer Sciences, University of California, Berkeley, CA, USA.
Kamath, Daya, et. al., "Edge virtual Bridge Proposal, Version 0. Rev. 0.1," Apr. 23, 2010, pp. 1-72, IEEE.
Keller, Eric, et al., "The 'Platform as a Service' Model for Networking," Month Unknown, 2010, pp. 1-6.
Koponen, Teemu, et al., "Onix: A Distributed Control Platform for Large-scale Production Networks," In Proc. OSDI, Oct. 2010, pp. 1-14.
Lakshminarayanan, Karthik, et al., "Routing as a Service," Month Unknown, 2004, pp. 1-15, Berkeley, California.
Luo, Jianying, et al., "Prototyping Fast, Simple, Secure Switches for Ethane," Month Unknown, 2007, pp. 1-6.
McKeown, Nick, et al., "OpenFlow: Enabling Innovation in Campus Networks," ACS SIGCOMM Computer communication Review, Apr. 2008, pp. 69-74, vol. 38, No. 2.
Mogul, Jeffrey C., et al., "API Design Challenges for Open Router Platforms on Proprietary Hardware," Oct. 2008, pp. 1-6.
Popa, Lucian, et al., "Building Extensible Networks with Rule-Based Forwarding," In USENIX OSDI, Month Unknown, 2010, pp. 1-14.
Yang, L., et al., "Forwarding and Control Element Separation (ForCES) Framework," Apr. 2004, pp. 1-40, The Internet Society.
Das, Suarav., et al., "Unifying Packet and Circuit Switched Networks with OpenFlow," Dec. 7, 2009, 10 pages.
Das, Suarav., et al. "Simple Unified Control for Packet and Circuit Networks," Month Unknown, 2009, pp. 147-148, IEEE.

* cited by examiner

FIREWALLS IN LOGICAL NETWORKS

CLAIM OF BENEFIT TO PRIOR APPLICATION

This application claims the benefit of U.S. Provisional Application 61/560,279, entitled "Virtual Middlebox Services", filed Nov. 15, 2011. U.S. Application 61/560,279 is incorporated herein by reference.

BACKGROUND

Many current enterprises have large and sophisticated networks comprising switches, hubs, routers, middleboxes (e.g., firewalls), servers, workstations and other networked devices, which support a variety of connections, applications and systems. The increased sophistication of computer networking, including virtual machine migration, dynamic workloads, multi-tenancy, and customer specific quality of service and security configurations require a better paradigm for network control. Networks have traditionally been managed through low-level configuration of individual network components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. This process is of increased difficulty where the network switching elements are shared across multiple users.

In response, there is a growing movement towards a new network control paradigm called Software-Defined Networking (SDN). In the SDN paradigm, a network controller, running on one or more servers in a network, controls, maintains, and implements control logic that governs the forwarding behavior of shared network switching elements on a per user basis. Making network management decisions often requires knowledge of the network state. To facilitate management decision-making, the network controller creates and maintains a view of the network state and provides an application programming interface upon which management applications may access a view of the network state.

Some of the primary goals of maintaining large networks (including both datacenters and enterprise networks) are scalability, mobility, and multi-tenancy. Many approaches taken to address one of these goals results in hampering at least one of the others. For instance, one can easily provide network mobility for virtual machines within an L2 domain, but L2 domains cannot scale to large sizes. Furthermore, retaining user isolation greatly complicates mobility. As such, improved solutions that can satisfy the scalability, mobility, and multi-tenancy goals are needed.

BRIEF SUMMARY

Some embodiments provide a system that allows several different logical firewalls to be specified for several different logical networks through one or more shared firewall elements. In some embodiments, the system distributes the logical firewall for a particular logical network across several different physical machines that also host virtual machines of the particular logical network. At each of the different physical machines, a firewall element operates that may be virtualized into several different firewall instances, each implementing a different set of firewall rules for a different logical firewall. In addition, each of these physical machines also operates a managed switching element to perform logical forwarding functionalities for one or more logical forwarding elements of the logical networks.

Such a firewall may be incorporated into a logical network in various different topologies, in some embodiments. For instance, a firewall may be specified to connect to a logical forwarding element (e.g., a logical router) out of the direct flow through the logical network, may be located between two logical forwarding elements, or between a logical forwarding element and an external network within the logical network topology.

The firewall of some embodiments analyzes data packets sent to it to determine whether or not the packets should be allowed through. The firewall stores a set of rules (e.g., entered by a user), that determine whether or not the firewall drops (i.e., discards) or allows the packet through (or, in some cases, rejects the packet by dropping the packet and sending an error response back to the sender). In some embodiments, the firewall is a stateful firewall that keeps track of transport (e.g., TCP and/or UDP) connections, and uses the stored state information to make faster packet processing decisions.

When the firewall is not located on a logical wire (i.e., between two logical network components), packets will not be sent to the firewall unless routing policies are specified (e.g., by a user such as a network administrator) for the logical forwarding element to which the firewall connects. Some embodiments enable the use of policy routing rules that forward packets based on data beyond the destination address (e.g., destination IP or MAC address).

In addition, the user specifies rules for the firewall packet processing. While the logical topology and policy routing rules are set up through the network controller API, some embodiments include a separate firewall-specific API (e.g., specific to the particular firewall deployed) through which the user configures the logical firewall. In some embodiments, these rules specify conditions which, if matched, result in either dropping or allowing the packet (similar to access control list (ACL) table entries). As an example, a user might specify that packets from a particular external IP address (or domain of IP addresses) are always dropped when destined for a particular subnet. In addition, the rules may relate to the existence of an established L4 (e.g., TCP) connection between two IP addresses.

In some embodiments, the logical network is implemented in a distributed, virtualized fashion. The various end machines (i.e., workloads) may be implemented as virtual machines hosted on numerous different physical host machines (e.g., servers in a grid of physical nodes), although in other embodiments some or all of the machines in the network are physical machines themselves.

In addition, some embodiments implement the logical switching and routing elements in a distributed, virtualized fashion. That is, rather than using physical switches to implement the logical forwarding elements, the forwarding responsibilities are spread across managed switching elements distributed throughout the network. For instance, some embodiments include switching software within the physical host machines. This switching software implements the logical forwarding elements of the logical networks in some embodiments.

In addition to distributing and virtualizing the end machines and the logical forwarding elements, some embodiments also distribute and/or virtualize the firewalls (and other middleboxes). That is, in some embodiments the firewall is implemented across various host machines within the network, rather than as a single centralized machine (some embodiments may alternatively, or conjunctively, include centralized firewalls). Some embodiments implement a firewall within the host machines at which virtual machines are located that may send and/or receive packets through the firewall. Furthermore, in some embodiments, the firewall module(s) running on the hosts may be sliced so as to implement multiple different firewalls (either several different firewalls for the same logical network or firewalls for several different networks). That is, within the same module, several separate firewall instances may run, implementing different packet processing instructions.

When the packets are sent to the firewall from the managed switching element, some embodiments include a slice identifier (or tag) to identify to which of the several firewalls the packet is being sent. When multiple firewalls are implemented for a single logical network, the slice identifier will need to identify more than just the logical network to which the packet belongs in order to be sent to the correct firewall instances. Different embodiments may use different slice identifiers for the firewalls.

In some embodiments, a network control system is utilized to configure both the managed switching elements and the firewalls. The network control system of some embodiments includes a logical controller that receives the logical network topology (e.g., as logical control plane data), information regarding the physical implementation of the network (e.g., the physical locations of the virtual machines of the network), and the firewall configuration. In order to configure the firewalls, the logical controller identifies the host machines on which to implement the firewalls, and provides the configuration data for distribution to those machines. In some embodiments, the configuration data is distributed through a set of physical controllers, with each physical host machine managed by a particular physical controller. Thus, the logical controller distributes the firewall configuration data to a set of physical controllers, which subsequently distribute the firewall configuration to the firewall modules on the host machines. In some embodiments, the physical controllers additionally assign the slice identifiers for the firewall instances, and a particular physical controller distributes the slice identifier to both the firewall instance and the managed switching element at its assigned host machine.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system that allows several different logical firewalls to be specified for several different logical networks through one or more shared firewall elements. In some embodiments, the system distributes the logical firewall for a particular logical network across several different physical machines that also host virtual machines of the particular logical network. At each of the different physical machines, a firewall element operates that may be virtualized into several different firewall instances, each implementing a different set of firewall rules for a different logical firewall. In addition, each of these physical machines also operates a managed switching element to perform logical forwarding functionalities for one or more logical forwarding elements of the logical networks.

Figure 1:
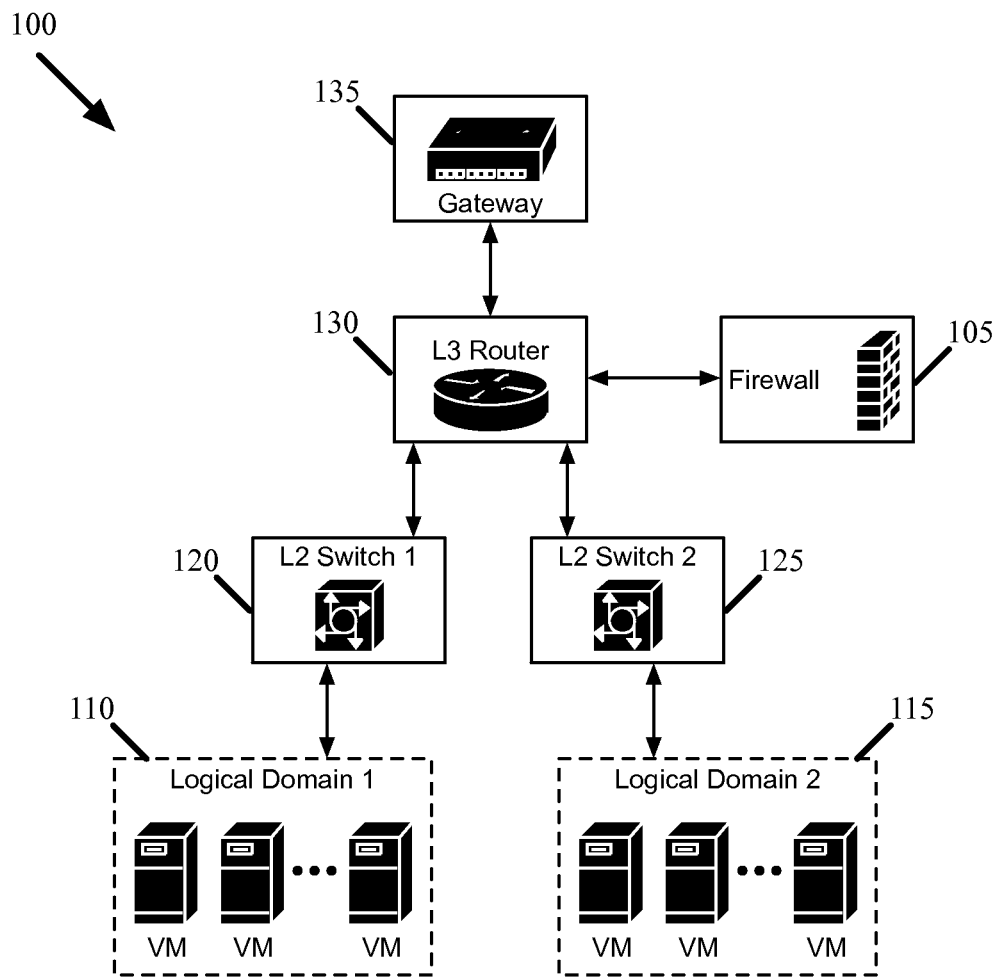
FIG. 1 conceptually illustrates a logical network architecture of some embodiments that includes a firewall.

FIG. 1 conceptually illustrates a logical network architecture 100 of some embodiments that includes a firewall 105. In the logical network architecture 100, two logical domains (i.e., subnets) 110 and 115 each contain several virtual machines connected within the domain by a logical L2 switch 120 and 125, respectively. These two logical domains 110 and 115 are connected together by a logical L3 router 130, and a gateway (also referred to as an extender) 135 provides connectivity to external networks.

In addition, the firewall 105 connects to the L3 router in order to process some or all packets that enter the logical router 130. One of ordinary skill in the art will recognize that the network architecture 100 represents just one particular logical network architecture into which a firewall may be incorporated. In various embodiments, the firewall may be located directly between two other components (e.g., as shown below in FIG. 2), directly between the gateway and logical router (e.g., in order to monitor and process all traffic entering or exiting the logical network), or in other locations in a more complex network.

The firewall 105 of some embodiments analyzes data packets sent to it to determine whether or not the packets should be allowed through. The firewall stores a set of rules (e.g., entered by a user), that determine whether or not the firewall drops (i.e., discards) or allows the packet through (or, in some cases, rejects the packet by dropping the packet and sending an error response back to the sender). In some embodiments, the firewall 105 is a stateful firewall that keeps track of transport (e.g., TCP and/or UDP) connections, and uses the stored state information to make faster packet processing decisions.

In the architecture shown in FIG. 1, the firewall 105 is not located within the direct traffic flow, either from one domain to the other, or between the external world and the domain. Accordingly, packets will not be sent to the firewall unless routing policies are specified (e.g., by a user such as a network administrator) at the logical router 130 that determine which packets should be sent to the firewall 105 for processing. Some embodiments enable the use of policy routing rules that forward packets based on data beyond the destination address (e.g., destination IP or MAC address). For example, a user might specify (e.g., through a network controller application programming interface (API) that all packets with a source IP address in the logical domain 110, or all packets that enter the network through the gateway 135, destined for the second logical domain 115, should be directed to the firewall 105 for processing.

In addition, the user specifies rules for the firewall packet processing. While the logical topology and policy routing rules are set up through the network controller API, some embodiments include a separate firewall-specific API (e.g., specific to the particular firewall deployed) through which the user configures the logical firewall. In some embodiments, these rules specify conditions which, if matched, result in either dropping or allowing the packet (similar to access control list (ACL) table entries). As an example, a user might specify that packets from a particular external IP address (or domain of IP addresses) are always dropped when destined for the domain 115. In addition, the rules may relate to the existence of an established L4 (e.g., TCP) connection between two IP addresses. For example, a particular rule or set of rules might specify that packets sent from the first logical domain 110 are not allowed into the second logical domain 115 unless a TCP connection initiated by the destination machine in the second domain 115 exists.

Figure 2:
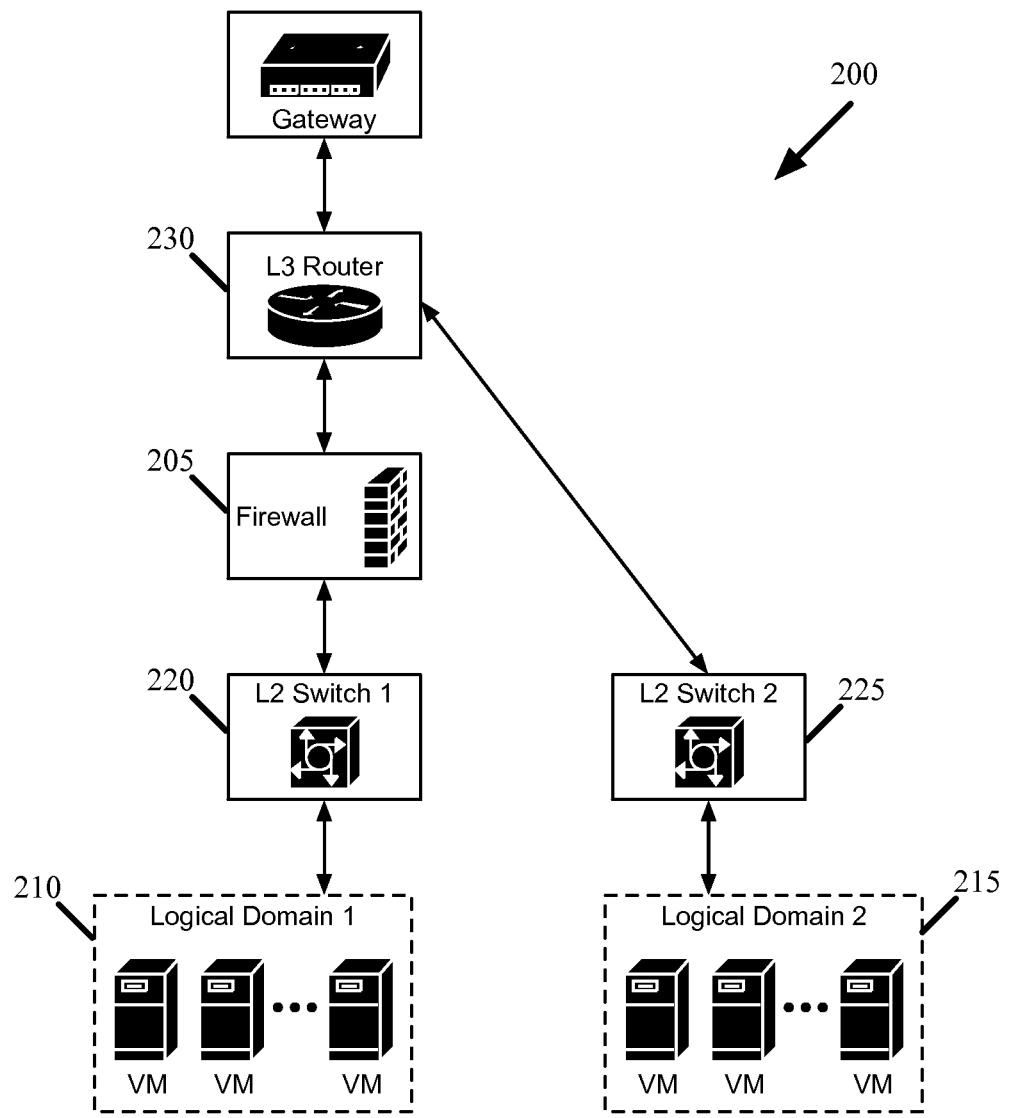
FIG. 2 conceptually illustrates a different logical topology for a network architecture of some embodiments that also includes a firewall.

As stated above, FIG. 1 illustrates a particular logical topology for the network 100. FIG. 2, as stated, conceptually illustrates a different logical topology for a network architecture 200 of some embodiments, that also includes a firewall 205. In this case, the structure of the network 200 without the firewall is the same as that for network 100, with a logical L3 router 230 linking two logical L2 switches 220 and 225, which each perform switching for machines on two logical domains 210 and 215. In this case, however, the firewall 205 is located on the logical wire between the first logical switch 220 and the logical router 230.

Such a setup is simpler for the network administrator because no routing policies need to be configured (as compared to the need for routing policies specifying when packets are sent to the firewall 105 from logical router 130 in the network 100), but offers less flexibility. Instead, all traffic between the logical switch 220 and the logical router 230 will be sent to the firewall 205. From a logical perspective, the firewall 205 is transparent to the switch 220 and the router 230. The flows for the managed switching elements that implement these logical forwarding elements, however, will need to be configured to send packets to the firewall rather than to the other one of the two logical forwarding elements.

In some embodiments, such a logical network (e.g., either network 100 or network 200) is implemented in a distributed, virtualized fashion. The various machines in the logical domains 110 and 115 may be implemented as virtual machines hosted on numerous different physical host machines (e.g., servers in a grid of physical nodes), although in other embodiments some or all of the machines in the network are physical machines themselves.

In addition, some embodiments implement the logical switching and routing elements (collectively referred to as logical forwarding elements) in a distributed, virtualized fashion. That is, rather than using physical switches to implement the logical forwarding elements, the forwarding responsibilities are spread across managed switching elements distributed throughout the network. For instance, some embodiments include switching software within the physical host machines (e.g., running on top of or within a hypervisor on the host). This switching software (e.g., open virtual switch ("OVS")) implements the logical forwarding elements of the logical networks in some embodiments.

In addition to distributing and virtualizing the end machines and the logical forwarding elements, some embodiments also distribute and/or virtualize the middleboxes, such as the firewall 105. That is, in some embodiments the firewall 105 is implemented across various host machines within the network, rather than as a single centralized machine (some embodiments may alternatively, or conjunctively, include centralized firewalls). Some embodiments implement a firewall within the host machines at which virtual machines are located that may send and/or receive packets through the firewall (e.g., running on top of or within a hypervisor on the host). Furthermore, in some embodiments, the firewall module(s) running on the hosts may be sliced so as to implement multiple different firewalls (either several different firewalls for the same logical network or firewalls for several different networks). That is, within the same module, several separate firewall instances may run, implementing different packet processing instructions.

Figure 3:
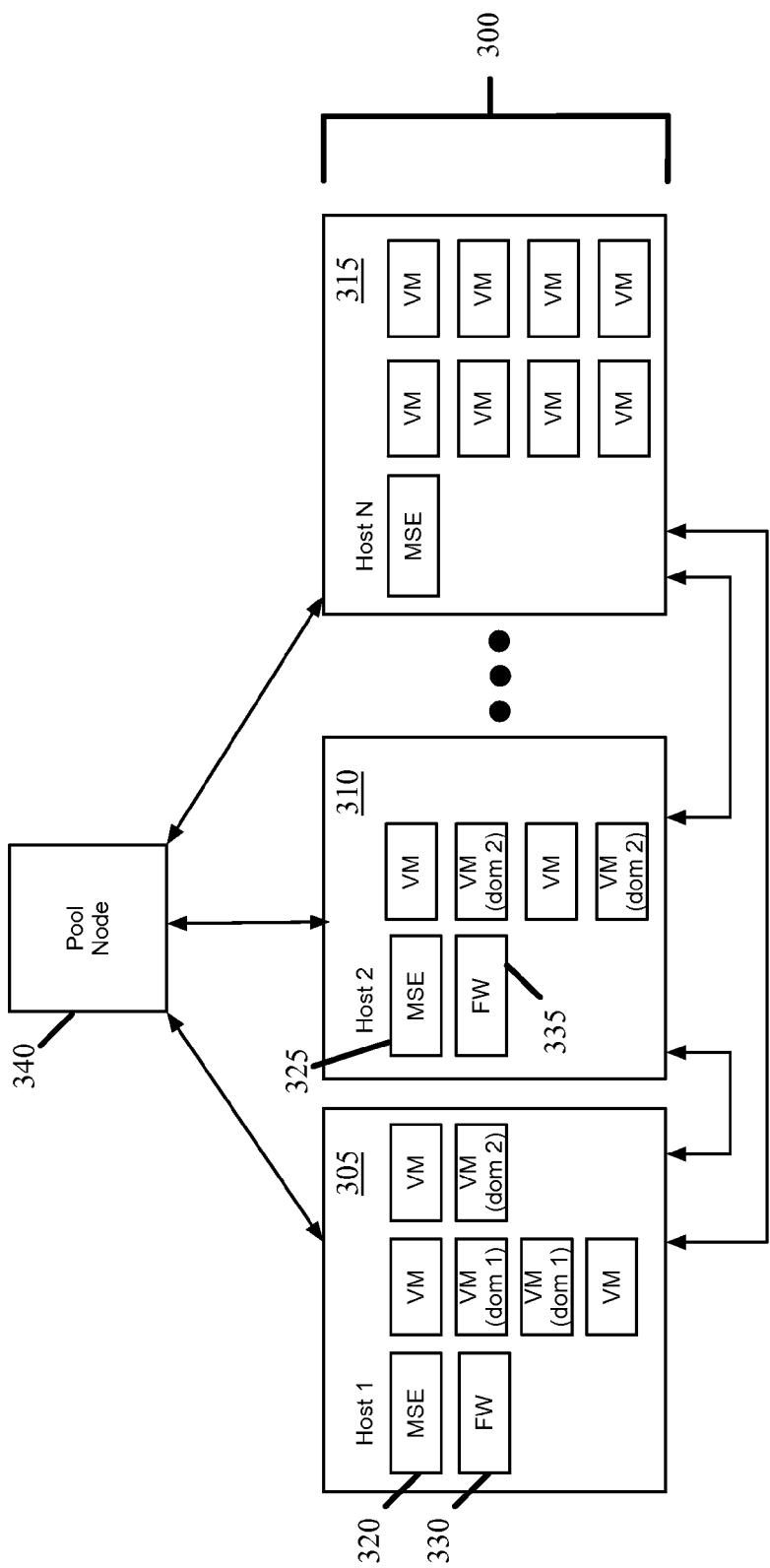
FIG. 3 conceptually illustrates several host machines implementing the logical network of FIG. 1.

FIG. 3 conceptually illustrates several host machines implementing the logical network 100. Specifically, FIG. 3 illustrates several hosts 300, including a first host 305, a second host 310, and a third host 315. Each of the hosts 300 includes several virtual machines, including machines on both the first and second hosts 305 and 310 that belong to the logical network 100. These machines are indicated as belonging to either the first domain 110 or the second domain 115. As shown, a given host may include virtual machines from one or both of the domains, as well as virtual machines belonging to other networks (e.g., to other network managed by different users). The third host 315 includes eight virtual machines, none of which are part of the network 100.

In addition, each of the hosts 300 includes a managed switching element ("MSE"). The managed switching elements of some embodiments are software forwarding elements that implement logical forwarding elements for one or more logical networks. For instance, the MSEs in the hosts 300 include flow entries in forwarding tables that implement the logical forwarding elements of network 100. Specifically, the MSE 320 on the first host 305 implements the logical switch 120, the logical switch 125, and the logical router 130. In some embodiments, because only virtual machines from the second domain 115 are located on the second host 310, the MSE 325 on the second host implements only the second logical switch 125 and the router 130, but not the first logical switch 120.

Similarly, the firewall modules 330 and 335 running on the hosts 305 and 310 both implement the firewall policies assigned to the firewall 105. When a packet is sent from one of the virtual machines of the logical domain 110 residing on the host 305, the managed switching element 320 performs the logical L2 processing of switch 120. When the destination address for the packet is located in the second logical domain 115, the flow entries implementing the L2 processing forward the packet to the logical router 130. The managed switching element then applies the flow entries for the logical router 130 to the packet. These flow entries may implement routing policies that send the packet to the logical firewall 105. In such cases, the packet is sent to the firewall module 330 (still on the host 305) for processing. If the firewall allows the packet through, then some embodiments send the packet back to the managed switching element (as a new packet, in some such embodiments) for additional processing by the forwarding tables implementing the logical router 130. These flow entries send the packet to the logical L2 switch 125, the forwarding tables for which are also stored in the MSE 320. The L2 flow entries identify the destination machine and send the packet to that machine (which may be located on the same host 305 or a different one of the hosts 300).

In some cases, the MSE located on a particular one of the hosts may not include forwarding tables for some of the logical forwarding required for a packet (due to the distributed nature of the forwarding elements). When the particular MSE does not store the necessary flow entries, some embodiments send the packet to a pool node 340 for additional processing. The pool nodes allow the various MSEs at different hosts to only store a description of subsections of a network, thereby limiting the amount of data required for each MSE.

The firewalls 330 and 335, as well as firewall modules on other hosts that contain machines in the logical network 100, store packet processing rules in order to implement the logical firewall 105. In addition, if one of the other virtual machines on one of the hosts is in a network with a distributed firewall, the firewall module operating on that host will store packet processing rules to implement the second firewall. These will effectively operate as two (or more) separate firewall instances, such that the firewall module is sliced into several "virtual" firewalls. In addition, when the packets are sent to the firewall from the managed switching element, some embodiments include a slice identifier (or tag) to identify to which of the several firewalls the packet is being sent. When multiple firewalls are implemented for a single logical network, the slice identifier will need to identify more than just the logical network to which the packet belongs in order to be sent to the correct firewall instances. Different embodiments may use different slice identifiers for the firewalls.

The above illustrates examples of the implementation of logical firewalls in a network of some embodiments. Several more detailed embodiments are described below. Section I describes the network control system of some embodiments for configuring a network in order to implement a logical network that includes a firewall. Section II describes the distributed firewall implementation of some embodiments. Next, Section III describes packet processing in a node that includes a distributed firewall. Section IV then describes the migration of firewall state information along with a migrating virtual machine. Finally, Section V describes an electronic system with which some embodiments of the invention are implemented.

I. Configuration of Logical Network

Figure 4:
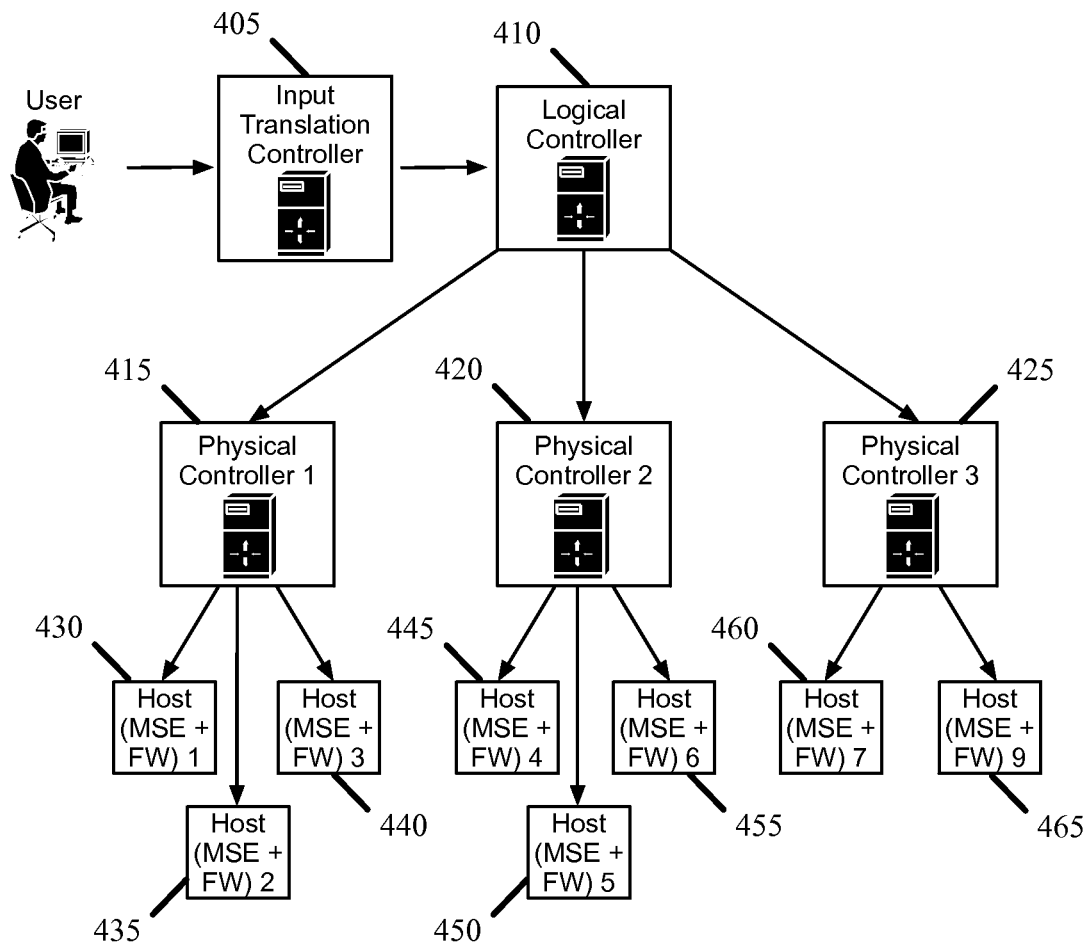
FIG. 4 illustrates a network control system of some embodiments for configuring managed switching elements and firewall modules in order to implement logical networks.

In order to implement a logical network such as that shown in FIG. 1, some embodiments configure the managed switching elements and distributed (or centralized) firewalls (as well as other middleboxes) through one or more network controllers of a network control system. FIG. 4 illustrates a network control system 400 of some embodiments for configuring managed switching elements and firewall modules in order to implement logical networks.

As shown, the network control system 400 includes an input translation controller 405, a logical controller 410, physical controllers 415-425, and hosts 430-465. As shown, the hosts 430-465 include managed switching element and firewall components. One of ordinary skill in the art will recognize that many other different combinations of the various controllers and hosts are possible for the network control system 400.

In some embodiments, each of the controllers in a network control system has the capability to function as an input translation controller, logical controller, and/or physical controller. Alternatively, in some embodiments a given controller may only have the functionality to operate as a particular one of the types of controller (e.g., as a physical controller). In addition, different combinations of controllers may run in the same physical machine. For instance, the input translation controller 405 and the logical controller 410 may run in the same computing device, with which a user interacts.

Furthermore, each of the controllers illustrated in FIG. 4 (and subsequent FIGS. 5 and 6) is shown as a single controller. However, each of these controllers may actually be a controller cluster that operates in a distributed fashion to perform the processing of a logical controller, physical controller, or input translation controller.

The input translation controller 405 of some embodiments includes an input translation application that translates network configuration information received from a user. For example, a user may specify a network topology such as that shown in FIG. 1, which includes a specification as to which machines belong in which logical domain. This effectively specifies a logical data path set, or a set of logical forwarding elements. For each of the logical switches, the user specifies the machines that connect to the logical switch (i.e., to which logical ports are assigned for the logical switch). In some embodiments, the user also specifies IP addresses for the machines. The input translation controller 405 translates the entered network topology into logical control plane data that describes the network topology. For example, an entry might state that a particular MAC address A is located at a particular logical port X.

In some embodiments, each logical network is governed by a particular logical controller (e.g., logical controller 410). The logical controller 410 of some embodiments translates the logical control plane data into logical forwarding plane data, and the logical forwarding plane data into universal control plane data. Logical forwarding plane data, in some embodiments, consists of flow entries described at a logical level. For the MAC address A at logical port X, logical forwarding plane data might include a flow entry specifying that if the destination of a packet matches MAC A, forward the packet to port X.

The universal physical control plane data of some embodiments is a data plane that enables the control system of some embodiments to scale even when it contains a large number of managed switching elements (e.g., thousands) to implement a logical data path set. The universal physical control plane abstracts common characteristics of different managed switching elements in order to express physical control plane data without considering differences in the managed switching elements and/or location specifics of the managed switching elements.

As stated, the logical controller 410 of some embodiments translates logical control plane data into logical forwarding plane data (e.g., logical flow entries), then translates the logical forwarding plane data into universal control plane data. In some embodiments, the logical controller application stack includes a control application for performing the first translation and a virtualization application for performing the second translation. Both of these applications, in some embodiments, use a rules engine for mapping a first set of tables into a second set of tables. That is, the different data planes are represented as tables (e.g., n Log tables), and the controller applications use a table mapping engine to translate between the data planes.

Each physical controller 415-425 is a master of one or more managed switching elements (e.g., located within host machines). In this example, the first and second physical controllers 415 and 420 are masters of three managed switching elements each, while the third physical controller 425 is the master of two managed switching elements. In some embodiments, a physical controller receives the universal physical control plane information for a logical network and translates this data into customized physical control plane information for the particular managed switches that the physical controller manages. In other embodiments, the physical controller passes the appropriate universal physical control plane data to the managed switch, which includes the ability (e.g., in the form of a chassis controller running on the host machine) to perform the conversion itself.

The universal physical control plane to customized physical control plane translation involves a customization of various data in the flow entries. For the example noted above, the universal physical control plane would involve several flow entries. The first entry states that if a packet matches the particular logical data path set (e.g., based on the packet being received at a particular physical input port), and the destination address matches MAC A, then forward the packet to logical port X. This flow entry will be the same in the universal and customized physical control planes, in some embodiments. Additional flows are generated to match the physical ingress port to a logical ingress port on the particular logical data path set, as well as to match logical port X to a particular egress port of the physical managed switch (e.g., a virtual interface of the host machine). However, these physical ingress and egress ports are specific to the host machine containing the managed switching element. As such, the universal physical control plane entries include abstract physical ports while the customized physical control plane entries include the actual physical ports involved.

In some embodiments, the network control system also disseminates data relating to the firewall of a logical network. The network control system may disseminate firewall configuration data, as well as attachment data relating to the sending and receiving of packets to/from the firewall at the managed switches and to/from the managed switches at the firewall. For instance, the flow entries propagated through the network control system to the managed switches will include entries for sending the appropriate packets to the firewall (e.g., flow entries that specify for packets that have a source IP address in a particular subnet to be forwarded to the firewall). In addition, the flow entries for the managed switch will need to specify how to send such packets to the firewall. That is, once a first entry specifies a logical egress port of the logical router to which the firewall is bound, additional entries are required to attach the logical egress port to the firewall.

When the firewall is a centralized appliance, these additional entries will match the logical egress port of the logical router to a particular physical port of the host machine (e.g., a physical network interface) through which the host machine connects to the firewall. In addition, the entries include encapsulation information for sending the packet to the centralized firewall appliance via a tunnel between the host machine and the firewall.

When the firewall is distributed, the packet does not have to actually leave the host machine in order to reach the firewall. However, the managed switching element nevertheless needs to include flow entries for sending the packet to the firewall module on the host machine. These flow entries, again, include an entry to map the logical egress port of the logical router to the port through which the managed switching element connects to the firewall. However, in this case the firewall attaches to a software abstraction of a port in the managed switching element, rather than a physical (or virtual) interface of the host machine. That is, a port is created within the managed switching element, to which the firewall attaches. The flow entries in the managed switching element send packets to this port in order for the packets to be routed within the host machine to the firewall.

As opposed to the tunneling information required for a centralized firewall, in some embodiments the managed switching element adds slicing information to the packet. Essentially, this slicing information is a tag that indicates to which of the (potentially) several instances being run by the firewall module the packet should be sent. Thus, when the firewall module receives the packet, the tag enables the module to use the appropriate set of packet processing rules in order to determine whether to drop, allow, etc. the packet. Some embodiments, rather than adding slicing information to the packet, define different ports of the managed switching element for each firewall instance, and essentially use the ports to slice the traffic destined for the firewall.

Figure 5:
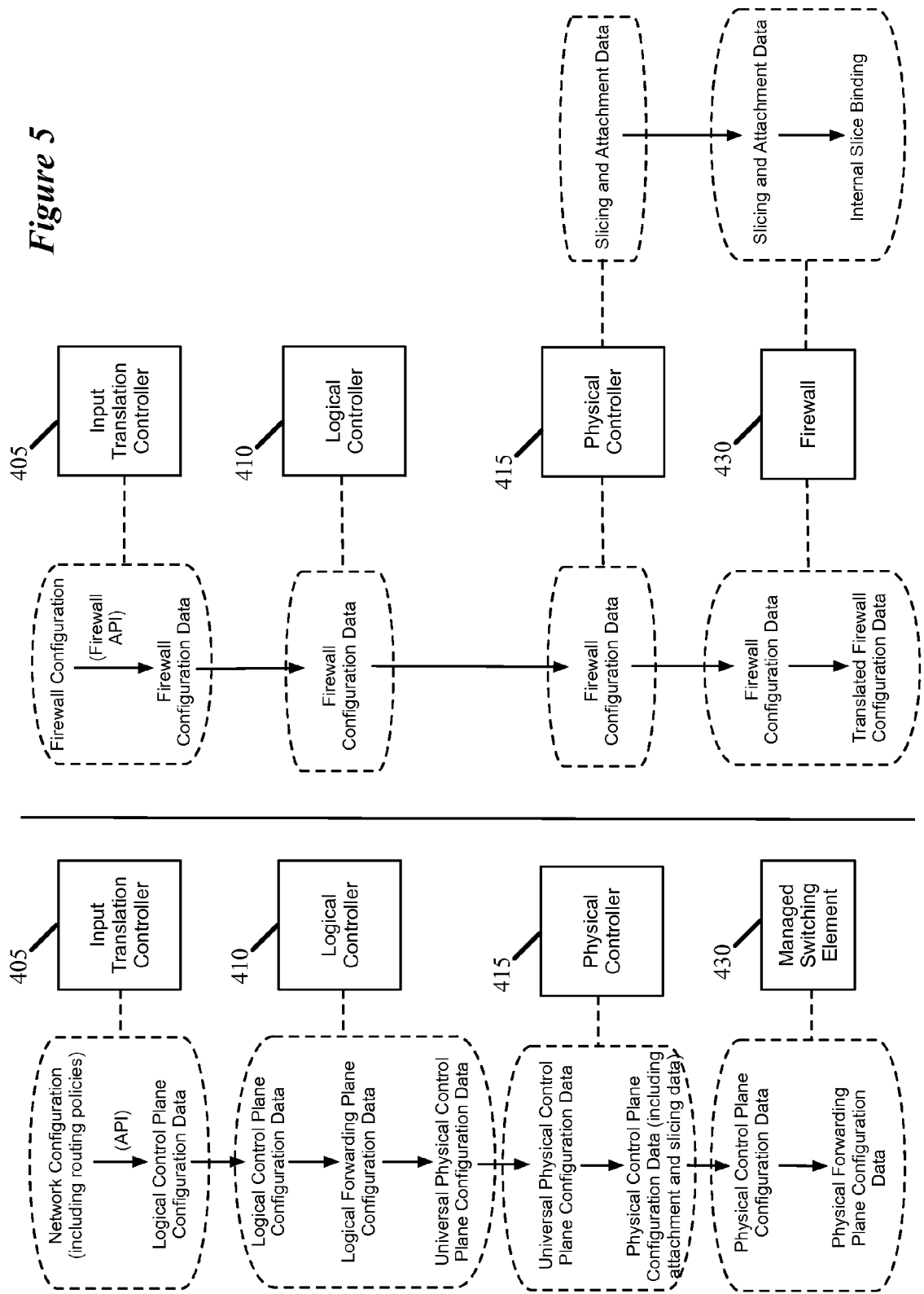
FIG. 5 conceptually illustrates the propagation of data through the network control system of some embodiments.

The above describes the propagation of the forwarding data to the managed switching elements. In addition, some embodiments use the network control system to propagate configuration data downward to the firewalls (and other middleboxes). FIG. 5 conceptually illustrates the propagation of data through the network control system of some embodiments. On the left side of the figure is the data flow to the managed switching elements that implement a logical network, while the right side of the figure shows the propagation of both firewall configuration data as well as network attachment and slicing data to the firewall modules.

On the left side, the input translation controller 405 receives a network configuration through an API, which is converted into logical control plane data. This network configuration data includes a logical topology such as those shown in FIG. 1 or FIG. 2. In addition, the network configuration data of some embodiments includes routing policies that specify which packets are sent to the firewall. When the firewall is located on a logical wire between two logical forwarding elements (as in network architecture 200), then all packets sent over that wire will automatically be forwarded to the firewall. However, for an out-of-band firewall such as that in network architecture 100, the logical router will only send packets to the firewall when particular policies are specified by the user.

Whereas routers and switches are typically configured to forward packets according to the destination address (e.g., MAC address or IP address) of the packet, policy routing allows forwarding decisions to be made based on other information stored by the packet (e.g., source addresses, a combination of source and destination addresses, etc.). For example, the user might specify that all packets with source IP addresses in a particular subnet, or that have destination IP addresses not matching a particular set of subnets, should be forwarded to the firewall. For the purposes of this figure, an example of "Send packets with a source IP address in the subnet {B} to firewall" will be used.

As shown, the logical control plane data is converted by the logical controller 410 (specifically, by the control application of the logical controller) to logical forwarding plane data, and then subsequently (by the virtualization application of the logical controller) to universal physical control plane data. For the example routing policy, the logical forwarding plane data is a flow entry of "If source IP is contained in {B}, then forward to Port K", where Port K is the logical port of the logical router that corresponds to the firewall. For this example, the logical router implements a logical data path set (LDPS) Q with two additional ports: Port M for packets received from a first logical switch and Port N for packets received from a second logical switch.

The universal physical control plane data for this example includes several flow entries. A first flow entry for the forwarding adds a match over the L3 logical data path, specifying "If match L3 logical data path set Q, and source IP is contained in {B}, then forward to Port K". Furthermore, the universal physical control plane data will include an ingress port integration entry for packets received from the first logical switch (that performs switching over logical subnet {B}), specifying "If received from Port X (of L2 switch), then mark ingress port as Port M of LDPS Q". A similar entry for packets received from the firewall will state, "If received from {software port abstraction mapping to firewall}, mark ingress port as Port K of LDPS Q". The universal physical control plane data also includes an egress port integration flow entry that enables packets to actually be sent to the firewall, specifying "If sent to Port K, run egress pipeline then send to {software port abstraction mapping to firewall}. In some embodiments, at the universal physical control plane level, the control plane data does not specify the actual port, because this may differ between host machines. Instead, an abstract indicator of the port that maps to the firewall is used.

The physical controller 415 (one of the several physical controllers), as shown, translates the universal physical control plane data into customized physical control plane data for the particular managed switching elements 430-440 that it manages. In the continuing example, the flow entries requiring translation are the port integration entries relating to the firewall, which must be configured to specify the ports appropriate for the particular configuration on the different host machines. This port might be a virtual NIC if the firewall runs as a virtual machine on the host machine, or the previously described software port abstraction within the managed switching element when the firewall runs as a process (e.g., daemon) within the hypervisor on the virtual machine. In some embodiments, for the latter situation, the port is an IPC channel or TUN/TAP device-like interface. In some embodiments, the managed switching element includes one specific port abstraction for the firewall module and sends this information to the physical controller in order for the physical controller to customize the physical control plane flows.

In addition, in some embodiments the physical controller adds flow entries specifying slicing information particular to the firewall implementation on the host machines. For instance, for a particular managed switching element, the flow entry may specify to add a particular tag (e.g., a VLAN tag or similar tag) to a packet before sending the packet to the particular firewall. This slicing information enables the firewall module to receive the packet and identify which of its several independent firewall instances should process the packet.

The managed switching element 430 (one of several MSEs managed by the physical controller 415) performs a translation of the customized physical control plane data into physical forwarding plane data. The physical forwarding plane data, in some embodiments, are the flow entries stored within a switching element (either a physical router or switch or a software switching element) against which the switching element actually matches received packets.

The right side of FIG. 5 illustrates two sets of data propagated to the distributed firewalls in the host machines rather than the managed switching elements. The first of these sets of data is the actual firewall configuration data, which includes various packet filtering rules. This data may be received at the input translation controller 405 or a different input interface, through an API particular to the firewall implementation. In some embodiments, different firewall modules will have different interface presented to the user (i.e., the user will have to enter information in different formats for different particular firewalls). As shown, the user enters a firewall configuration, which is translated by the firewall API into firewall configuration data. The user may enter rules that packets with particular source subnets or specific IP addresses should be blocked, discarded, allowed, etc., particular rules to apply to transport sessions (e.g., TCP connections) which may depend on the IP address or subnet of the source and/or destination for the packets, as well as various other firewall rules. In some embodiments, the firewall configuration data is a set of records, with each record specifying a particular firewall matching rule. These records, in some embodiments, are similar to the flow entries (e.g., ACL entries) propagated to the managed switching elements. In fact, some embodiments use the same applications on the controllers to propagate the firewall configuration records as for the flow entries, and the same table mapping language (e.g., n Log) for the records.

The firewall configuration data, in some embodiments, is not translated by the logical or physical controller, while in other embodiments the logical and/or physical controller perform at least a minimal translation of the firewall configuration data records. As the firewall packet processing rules operate on the IP address (or TCP connection state) of the packets, and the packets sent to the firewall will have this information exposed (i.e., not encapsulated within the logical port information), the firewall configuration does not require translation from logical to physical data planes. Thus, the same firewall configuration data is passed from the input translation controller 405 (or other interface), to the logical controller 410, to the physical controller 415.

In some embodiments, the logical controller 410 stores a description of the logical network and of the physical implementation of that physical network. The logical controller receives the one or more firewall configuration records, and identifies which of the various nodes (i.e., host machines) will need to receive the firewall configuration information. In some embodiments, the entire firewall configuration is distributed to firewall modules at all of the host machines, so the logical controller identifies all of the machines on which at least one virtual machine resides whose packets require use of the firewall. This may be all of the virtual machines in a network (e.g., as for the firewall shown in FIG. 1), or a subset of the virtual machines in the network (e.g., when a firewall is only applied to traffic of a particular domain within the network). Some embodiments make decisions about which host machines to send the configuration data to on a per-record basis. That is, each firewall rule may apply only to a subset of the virtual machines, and only hosts running these virtual machines need to receive the record.

Once the logical controller identifies the particular nodes to receive the firewall records, the logical controller identifies the particular physical controllers that manage these particular nodes. As mentioned, each host machine has an assigned master physical controller. Thus, if the logical controller identifies only first and second hosts as destinations for the firewall configuration data, the physical controllers for these hosts will be identified to receive the data from the logical controller (and other physical controllers will not receive this data). In order to supply the firewall configuration data to the hosts, the logical controller of some embodiments pushes the data (using an export module that accesses the output of the table mapping engine in the logical controller) to the physical controllers. In other embodiments, the physical controllers request configuration data (e.g., in response to a signal that the configuration data is available) from the export module of the logical controller.

The physical controllers pass the data to the firewall modules on the host machines that they manage, much as they pass the physical control plane data. In some embodiments, the firewall configuration and the physical control plane data are sent to the same database running on the host machine, and the managed switching element and firewall module retrieve the appropriate information from the database.

In some embodiments, the firewall at the host machine translates the firewall configuration data. The firewall configuration data will be received in a particular language to express the packet processing rules. The firewall module of some embodiments compiles these rules into more optimized packet classification rules. In some embodiments, this transformation is similar to the physical control plane to physical forwarding plane data translation. When the firewall module receives a packet, the firewall applies the compiled optimized packet processing rules in order to efficiently and quickly classify and process the packet.

In addition to the firewall configuration rules, the firewall modules receive slicing and/or attachment information in order to receive packets from and send packets to the managed switching elements. This information corresponds to the information sent to the managed switching elements. As shown, in some embodiments the physical controller 415 generates the slicing and attachment information for the firewall (i.e., this information is not generated at the input or logical controller level of the network control system).

The physical controllers, in some embodiments, receive information about the software port of the managed switching element to which the firewall connects from the managed switching element itself, then passes this information down to the firewall. In other embodiments, however, the use of this port is contracted directly between the firewall module and the managed switching element within the host machine, so that the firewall does not need to receive the attachment information from the physical controller. In some such embodiments, the managed switching element nevertheless transmits this information to the physical controller in order for the physical controller to customize the universal physical control plane flow entries for receiving packets from and sending packets to the firewall.

The slicing information generated by the physical controller, in some embodiments, consists of an identifier for the firewall instance to be used for the particular logical network. In some embodiments, as described, the firewall module operating on the host machine is used by multiple logical networks. When the firewall receives a packet from the managed switching element, in some embodiments the packet includes a prepended tag (e.g., similar to a VLAN tag) that identifies a particular one of the firewall instances (i.e., a set of rules within the firewall) to use in processing the packet.

As shown in FIG. 5, the firewall translates this slicing information into an internal slice binding. In some embodiments, the firewall uses its own internal identifiers (different from the tags prepended to the packets) in order to identify states (e.g., active TCP connections) within the firewall. Upon receiving an instruction to create a new firewall instance and an external identifier (that used on the packets) for the new firewall instance, some embodiments automatically create the new firewall instance and assign the instance an internal identifier. In addition, the firewall module stores a binding for the instance that maps the external slice identifier to the module's internal slice identifier.

Figure 6:
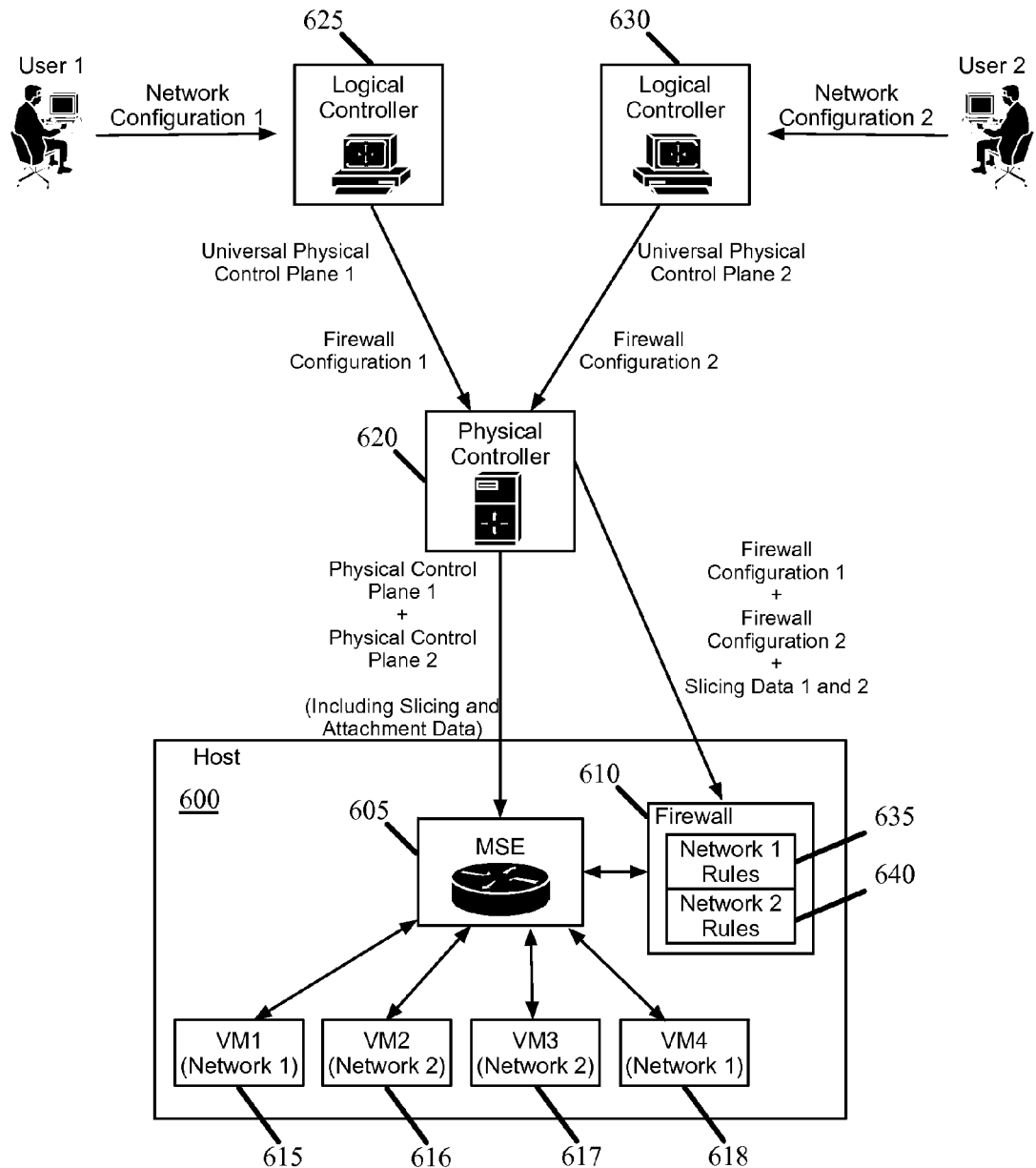
FIG. 6 conceptually illustrates a view of the propagation of information down to a single host machine that hosts virtual machines belonging to two different logical networks of two different tenants.

FIG. 6 conceptually illustrates a view of the propagation of information down to a single host machine 600 that hosts virtual machines belonging to two different logical networks of two different tenants. As shown, the host machine includes a managed switching element 605, a firewall 610, and four virtual machines 615-618 that belong either to network 1 or network 2. The host machine 600 is managed by a physical controller 620, to which two different logical controllers 625 and 630 connect. In this example, the logical controllers 625 and 630 also include input translation controllers (e.g., within the logical controller functionality or running on the same physical machine as the logical controller).

A first user inputs a first network configuration (i.e., for a first logical network) into the logical controller 625 and a second user inputs a second network configuration (i.e., for a second logical network) into the logical controller 630. Each of these logical networks includes a distributed firewall as well as several virtual machines, with two of the virtual machines from each of the logical networks assigned to the host 600. In this example, the network configurations additionally include the configuration (i.e., specification of the packet processing rules) for the firewalls within the networks.

Thus, the first logical controller 625 converts the first network configuration into a first universal physical control plane and sends this to the physical controller 620 along with the first firewall configuration. One of ordinary skill in the art will recognize that the logical controller 625 will in fact send this information (or relevant portions thereof) to several physical controllers that manage switching elements on machines that host virtual machines in the first logical network. Similarly, the second logical controller 630 converts the second network configuration into a second universal control plane and sends this information to the physical controller 620 along with the second firewall configuration.

The same physical controller 620 is used to convey data for both logical networks to the managed switching element 605 and the firewall 610 on the host 600. As shown, the physical controller converts the first universal physical control plane into a first customized physical control plane, and the second universal physical control plane into a second customized physical control plane, and transfers both of these sets of flow entries to the managed switching element 605. This customized physical control plane data includes attachment information in the flow entries that directs packets for the firewall to a particular software port of the managed switching element.

In addition, the physical controller 620 conveys both the first and second firewall configurations to the firewall module 610 operating on the host 600. These configurations specify the packet processing rules that the firewall uses to determine whether to allow, drop, etc. packets sent to it by the managed switching element. As shown, the firewall 610 stores a first set of configuration rules 635 and a second set of configuration rules 640.

In addition, the physical controller transmits slicing data to the firewall for both of the logical networks. As stated, this slicing data for a particular one of the networks includes a tag that the managed switching element 605 prepends to packets that are part of the particular network before sending the packets to the firewall 610. The firewall then knows whether to use the first set of configuration rules 635 or the second set of configuration rules 640.

While this figure is drawn showing the first and second configurations being sent to the physical controller 620 at the same time, and the physical controller passing the first and second configurations to the managed switching element 605 and firewall 610 together, one of ordinary skill in the art will recognize that the more likely situation is that the users input the network configurations at different times (though this does not mean the two logical controllers are precluded from both accessing the physical controller at the same time).

Figure 7:
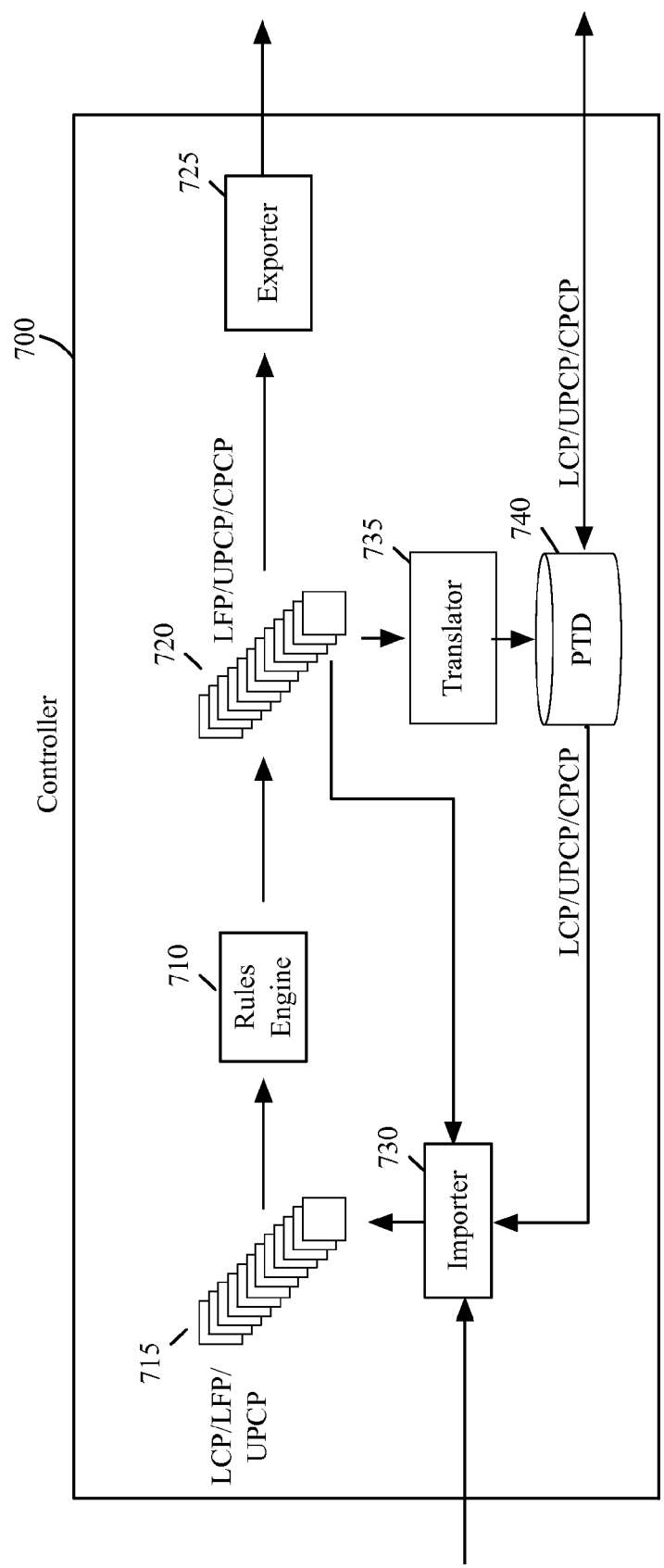
FIG. 7 illustrates example architecture of a network controller.

The above figures illustrate various physical and logical network controllers. FIG. 7 illustrates example architecture of a network controller (e.g., a logical controller or a physical controller) 700. The network controller of some embodiments uses a table mapping engine to map data from an input set of tables to data in an output set of tables. The input set of tables in a controller include logical control plane (LCP) data to be mapped to logical forwarding plane (LFP) data, LFP data to be mapped to universal physical control plane (UPCP) data, and/or UPCP data to be mapped to customized physical control plane (CPCP) data. The input set of tables may also include middlebox configuration data to be sent to another controller and/or a distributed middlebox instance. The network controller 700, as shown, includes input tables 715, a rules engine 710, output tables 720, an importer 730, an exporter 735, a translator 735, and a persistent data storage (PTD) 740.

In some embodiments, the input tables 715 include tables with different types of data depending on the role of the controller 700 in the network control system. For instance, when the controller 700 functions as a logical controller for a user's logical forwarding elements, the input tables 715 include LCP data and LFP data for the logical forwarding elements. When the controller 700 functions as a physical controller, the input tables 715 include LFP data. The input tables 715 also include middlebox configuration data received from the user or another controller. The middlebox configuration data is associated with a logical datapath set parameter that identifies the logical switching elements to which the middlebox to be is integrated.

In addition to the input tables 715, the control application 700 includes other miscellaneous tables (not shown) that the rules engine 710 uses to gather inputs for its table mapping operations. These miscellaneous tables include constant tables that store defined values for constants that the rules engine 710 needs to perform its table mapping operations (e.g., the value 0, a dispatch port number for resubmits, etc.). The miscellaneous tables further include function tables that store functions that the rules engine 710 uses to calculate values to populate the output tables 725.

The rules engine 710 performs table mapping operations that specifies one manner for converting input data to output data. Whenever one of the input tables is modified (referred to as an input table event), the rules engine performs a set of table mapping operations that may result in the modification of one or more data tuples in one or more output tables.

In some embodiments, the rules engine 710 includes an event processor (not shown), several query plans (not shown), and a table processor (not shown). Each query plan is a set of rules that specifies a set of join operations that are to be performed upon the occurrence of an input table event. The event processor of the rules engine 710 detects the occurrence of each such event. In some embodiments, the event processor registers for callbacks with the input tables for notification of changes to the records in the input tables 715, and detects an input table event by receiving a notification from an input table when one of its records has changed.

In response to a detected input table event, the event processor (1) selects an appropriate query plan for the detected table event, and (2) directs the table processor to execute the query plan. To execute the query plan, the table processor, in some embodiments, performs the join operations specified by the query plan to produce one or more records that represent one or more sets of data values from one or more input and miscellaneous tables. The table processor of some embodiments then (1) performs a select operation to select a subset of the data values from the record(s) produced by the join operations, and (2) writes the selected subset of data values in one or more output tables 720.

Some embodiments use a variation of the datalog database language to allow application developers to create the rules engine for the controller, and thereby to specify the manner by which the controller maps logical datapath sets to the controlled physical switching infrastructure. This variation of the datalog database language is referred to herein as n Log. Like datalog, n Log provides a few declaratory rules and operators that allow a developer to specify different operations that are to be performed upon the occurrence of different events. In some embodiments, n Log provides a limited subset of the operators that are provided by datalog in order to increase the operational speed of n Log. For instance, in some embodiments, n Log only allows the AND operator to be used in any of the declaratory rules.

The declaratory rules and operations that are specified through n Log are then compiled into a much larger set of rules by an n Log compiler. In some embodiments, this compiler translates each rule that is meant to address an event into several sets of database join operations. Collectively the larger set of rules forms the table mapping rules engine that is referred to as the n Log engine.

Some embodiments designate the first join operation that is performed by the rules engine for an input event to be based on the logical datapath set parameter. This designation ensures that the rules engine's join operations fail and terminate immediately when the rules engine has started a set of join operations that relate to a logical datapath set (i.e., to a logical network) that is not managed by the controller.

Like the input tables 715, the output tables 720 include tables with different types of data depending on the role of the controller 700. When the controller 700 functions as a logical controller, the output tables 715 include LFP data and UPCP data for the logical switching elements. When the controller 700 functions as a physical controller, the output tables 720 include CPCP data. Like the input tables, the output tables 715 may also include the middlebox configuration data. Furthermore, the output tables 715 may include a slice identifier when the controller 700 functions as a physical controller.

In some embodiments, the output tables 720 can be grouped into several different categories. For instance, in some embodiments, the output tables 720 can be rules engine (RE) input tables and/or RE output tables. An output table is a RE input table when a change in the output table causes the rules engine to detect an input event that requires the execution of a query plan. An output table can also be an RE input table that generates an event that causes the rules engine to perform another query plan. An output table is a RE output table when a change in the output table causes the exporter 725 to export the change to another controller or a MSE. An output table can be an RE input table, a RE output table, or both an RE input table and a RE output table.

The exporter 725 detects changes to the RE output tables of the output tables 720. In some embodiments, the exporter registers for callbacks with the RE output tables for notification of changes to the records of the RE output tables. In such embodiments, the exporter 725 detects an output table event when it receives notification from a RE output table that one of its records has changed.

In response to a detected output table event, the exporter 725 takes each modified data tuple in the modified RE output tables and propagates this modified data tuple to one or more other controllers or to one or more MSEs. When sending the output table records to another controller, the exporter in some embodiments uses a single channel of communication (e.g., a RPC channel) to send the data contained in the records. When sending the RE output table records to MSEs, the exporter in some embodiments uses two channels. One channel is established using a switch control protocol (e.g., OpenFlow) for writing flow entries in the control plane of the MSE. The other channel is established using a database communication protocol (e.g., JSON) to send configuration data (e.g., port configuration, tunnel information).

In some embodiments, the controller 700 does not keep in the output tables 720 the data for logical datapath sets that the controller is not responsible for managing (i.e., for logical networks managed by other logical controllers). However, such data is translated by the translator 735 into a format that can be stored in the PTD 740 and is then stored in the PTD. The PTD 740 propagates this data to PTDs of one or more other controllers so that those other controllers that are responsible for managing the logical datapath sets can process the data.

In some embodiments, the controller also brings the data stored in the output tables 720 to the PTD for resiliency of the data. Therefore, in these embodiments, a PTD of a controller has all the configuration data for all logical datapath sets managed by the network control system. That is, each PTD contains the global view of the configuration of the logical networks of all users.

The importer 730 interfaces with a number of different sources of input data and uses the input data to modify or create the input tables 710. The importer 720 of some embodiments receives the input data from another controller. The importer 720 also interfaces with the PTD 740 so that data received through the PTD from other controller instances can be translated and used as input data to modify or create the input tables 710. Moreover, the importer 720 also detects changes with the RE input tables in the output tables 730.

II. Distributed Firewall Implementation

As described above, the firewall of some embodiments is implemented in a distributed fashion, with firewall modules operating in some or all of the host machines on which the virtual machines and managed switching elements of a logical network are located. While some embodiments use a centralized firewall implementation (e.g., a single virtual machine or a single physical appliance, a cluster of firewall resources, etc.), this section describes the distributed firewall implementation of some embodiments within a host machine.

Figure 8:
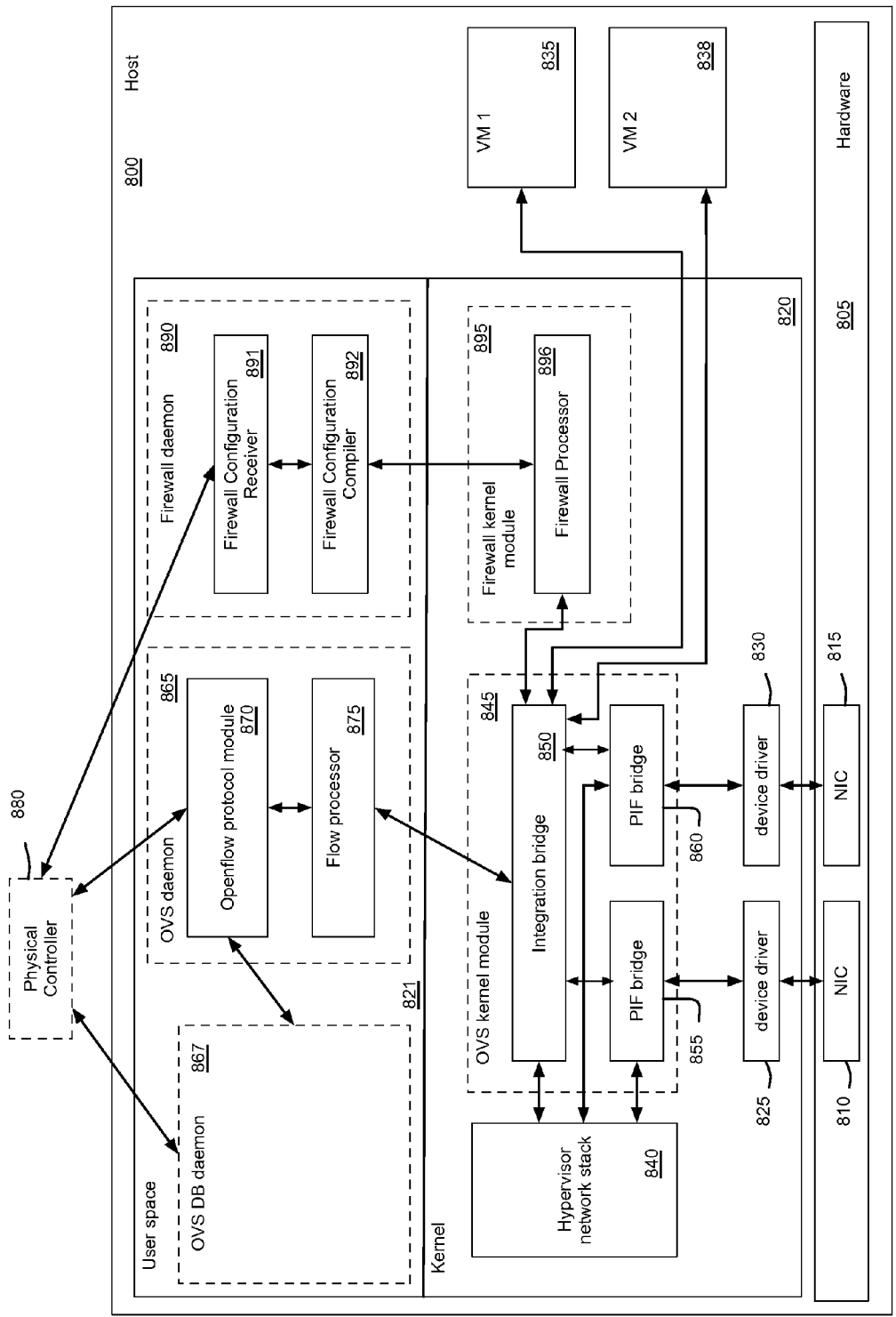
FIG. 8 conceptually illustrates an architectural diagram of a host machine of some embodiments that includes both a distributed software firewall element and a software switching element.

FIG. 8 conceptually illustrates an architectural diagram of a host machine 800 of some embodiments that includes both a distributed software firewall element and a software switching element. In this example, the firewall element includes two components on the host machine—a firewall daemon 890 that runs in the user space of the host machine 800 and a firewall kernel module 895 that runs in the kernel of the host machine 800. While this figure illustrates the distributed firewall element as two components for the purpose of explanation, the firewall daemon 890 and the firewall kernel module 895 collectively form the firewall element running on the host machine 800. The software switching element (an open virtual switch ("OVS"), in this example) includes three components—an OVS kernel module 845 that runs in the kernel of the host machine 800, and an OVS daemon 865 and an OVS database (DB) daemon 867, which run in the user space of the host machine.

As illustrated in FIG. 8, the host 800 includes hardware 805, kernel 820, user space 821, and VMs 885-895. The hardware 805 may include typical computer hardware, such as processing units, volatile memory (e.g., random access memory (RAM)), non-volatile memory (e.g., hard disk drives, flash memory, optical discs, etc.), network adapters, video adapters, or any other type of computer hardware. As shown, the hardware 805 includes NICs 810 and 815, which in some embodiments are typical network interface controllers for connecting a computing device to a network.

As shown in FIG. 8, the host machine 800 includes a kernel 820 and a user space 821. In some embodiments, the kernel is the most basic component of an operating system that runs on a separate memory space and is responsible for managing system resources (e.g., communication between hardware and software resources). In contrast, the user space is a memory space where all user mode applications may run.

The kernel 820 of some embodiments is a software abstraction layer that runs on top of the hardware 805 and runs below any operating system. In some embodiments, the kernel 820 performs virtualization functionalities (e.g., to virtualize the hardware 805 for several virtual machines operating on the host machine). The kernel 820 is then part of a hypervisor, in some embodiments. The kernel 820 handles various management tasks, such as memory management, processor scheduling, or any other operations for controlling the execution of the VMs 835 and 838 operating on the host machine.

As shown, the kernel 820 includes device drivers 825 and 830 for the NICs 810 and 815, respectively. The device drivers 825 and 830 allow an operating system (e.g., of a virtual machine) to interact with the hardware of the host 800. In this example, the device driver 825 allows interaction with the NIC 810, while the driver 830 allows interaction with the NIC 815. The kernel 820 may include other device drivers (not shown) for allowing the virtual machines to interact with other hardware (not shown) in the host 800.

The virtual machines 835 and 838 are independent virtual machines running on the host machine 800, using resources virtualized by the kernel 820. As such, the VMs run any number of different operating systems. Examples of such operations systems include Solaris, FreeBSD, or any other type of Unix-based operating system. Other examples include Windows-based operating systems as well.

As shown, the user space 821 (which, in some embodiments, is the user space of the hypervisor) includes the firewall daemon 890, the OVS daemon 865, and the OVS DB daemon 867. Other applications (not shown) may be included in the user space 821 as well, including daemons for other distributed middleboxes (e.g., load balancers, network address translators, etc.). The OVS daemon 865 is an application that runs in the user space 821. Some embodiments of the OVS daemon 865 communicate with a network controller 880 in order to receive instructions, as described above in the previous section, for processing and forwarding packets sent to and from the virtual machines 835 and 838. The OVS daemon 865 of some embodiments communicates with the network controller 880 through the OpenFlow protocol, while other embodiments use different communication protocols for transferring the physical control plane data. Additionally, in some embodiments the OVS daemon 865 retrieves configuration information from the OVS DB daemon 867 after the network controller 880 transmits the configuration information to the OVS DB daemon.

In some embodiments, the OVS DB daemon 867 is also an application that runs in the user space 821. The OVS DB daemon 867 of some embodiments communicates with the network controller 880 in order to configure the OVS switching element (e.g., the OVS daemon 865 and/or the OVS kernel module 845). For instance, the OVS DB daemon 867 receives configuration information from the network controller 880 and stores the configuration information in a set of databases. In some embodiments, the OVS DB daemon 867 communicates with the network controller 880 through a database communication protocol. In some cases, the OVS DB daemon 867 may receive requests for configuration information from the OVS daemon 865. The OVS DB daemon 867, in these cases, retrieves the requested configuration information (e.g., from a set of databases) and sends the configuration information to the OVS daemon 865.

The OVS daemon 865 includes an OpenFlow protocol module 870 and a flow processor 875. The OpenFlow protocol module 870 communicates with the network controller 880 to receive configuration information (e.g., flow entries) from the network controller 880 for configuring the software switching element. When the module 870 receives configuration information from the network controller 880, it translates the configuration information into information understandable by the flow processor 875.

The flow processor 875 manages the rules for processing and routing packets. For instance, the flow processor 875 stores rules (e.g., in a storage medium, such as a disk drive) received from the OpenFlow protocol module 870. In some embodiments, the rules are stored as a set of flow tables that each includes a set of flow entries. The flow processor 875 handles packets for which integration bridge 850 (described below) does not have a matching rule. In such cases, the flow processor 875 matches the packets against its stored rules. When a packet matches a rule, the flow processor 875 sends the matched rule and the packet to the integration bridge 850 for the integration bridge 850 to process. This way, when the integration bridge 850 receives a similar packet that matches the generated rule, the packet will be matched against the generated exact match rule in the integration bridge 850 and the flow processor 875 will not have to process the packet.

In some embodiments, the flow processor 875 may not have a rule to which the packet matches. In such cases, some embodiments of the flow processor 875 send the packet to another managed switching element (e.g., a pool node) for handling packets that cannot be processed by an edge switching element. However, in other cases, the flow processor 875 may have received from the network controller 880 a catchall rule that drops the packet when a rule to which the packet matches does not exist in the flow processor 875.

As illustrated in FIG. 8, the kernel 820 includes a hypervisor network stack 840 and an OVS kernel module 845. The hypervisor network stack 840 is an Internet Protocol (IP) network stack in some embodiments. The hypervisor network stack 840 processes and routes IP packets that are received from the OVS kernel module 845 and the PIF bridges 855 and 860. When processing a packet that is destined for a network host external to the host 800, the hypervisor network stack 840 determines to which of the physical interface (PIF) bridges 855 and 860 the packet should be sent.

The OVS kernel module 845 processes and routes network data (e.g., packets) between VMs running on the host 800 and network hosts external to the host 800 (e.g., network data received through the NICs 810 and 815). In some embodiments, the OVS kernel module 845 implements the forwarding tables of the physical control plane for one or more logical networks. To facilitate the processing and routing of network data, the OVS kernel module 845 communicates with OVS daemon 865 (e.g., to receive flow entries from the OVS daemon 865). In some embodiments, the OVS kernel module 845 includes a bridge interface (not shown) that allows the hypervisor network stack 840 to send packets to and receive packets from the OVS kernel module 845.

FIG. 8 illustrates that the OVS kernel module 845 includes an integration bridge 850 and the PIF bridges 855 and 860. In some embodiments, the OVS kernel module 845 includes a PIF bridge for each NIC in the hardware 805. In other embodiments, a PIF bridge in the OVS kernel module 845 may interact with more than one NIC in the hardware 805. The PIF bridges 855 and 860 route network data between the hypervisor network stack 840 and network hosts external to the host 800 (i.e., network data received through the NICs 810 and 815)

The integration bridge 850 processes and routes packets received from the hypervisor network stack 840, the VMs 835 and 838 (e.g., through VIFs), and the PIF bridges 855 and 860. In some embodiments, the integration bridge 850 stores a subset of the rules stored in the flow processor 875 (and/or rules derived from rules stored in the flow processor 875) that the integration bridge 850 is currently using or was recently using to process and forward packets.

In some embodiments, the flow processor 875 of some embodiments is responsible for managing rules in the integration bridge 850. In some embodiments, the integration bridge 850 stores only active rules. The flow processor 875 monitors the rules stored in the integration bridge 850 and removes the active rules that have not been access for a defined amount of time (e.g., 1 second, 3 seconds, 5 seconds, 10 seconds, etc.). In this manner, the flow processor 875 manages the integration bridge 850 so that the integration bridge 850 stores rules that are being used or have recently been used.

Although FIG. 8 illustrates one integration bridge, the OVS kernel module 845 may include multiple integration bridges. For instance, in some embodiments, the OVS kernel module 845 includes a separate integration bridge for each logical switching element that is implemented across a managed network to which the software switching element belongs. That is, the OVS kernel module 845 has a corresponding integration bridge for each logical switching element that is implemented across the managed network.

The above description relates to the forwarding functions of the managed software switching element of some embodiments. Just as the software switching element includes a user space component that implements the control plane (the OVS daemon 865) and a kernel component that implements the data plane (the OVS kernel module 845), the firewall of some embodiments includes a control plane component operating in the user space (the firewall daemon 890) and a data plane component operating in the kernel (the firewall kernel module 895).

As shown, the firewall daemon 890 includes a firewall configuration receiver 891 and a firewall configuration compiler 892. The firewall configuration receiver 891 communicates with the network controller 880 in order to receive the configuration of the firewall (e.g., the packet processing rules for the firewall), as well as slicing information. As described above, the slicing information assigns an identifier to a particular firewall instance to be performed by the distributed firewall. In some embodiments, the identifier is bound to a particular logical firewall in a particular tenant's logical network. That is, when a particular logical network includes several different firewalls with different processing rules, the firewall daemon 890 will create several firewall instances. Each of these instances is identified with a different slice identifier on packets sent to the firewall. In addition, in some embodiments the firewall daemon 890 assigns a particular internal identifier for each of these instances, which the firewall uses in its internal processing (e.g., in order to keep track of active TCP connections that it is monitoring).

The firewall daemon 890 also includes a firewall configuration compiler 892. In some embodiments, the firewall configuration compiler 892 receives the firewall configuration (the packet processing rules) for a particular firewall instance in a first language, and compiles these into a set of rules in a second language more optimized for the internal processing of the firewall. The firewall configuration compiler 892 sends the compiled packet processing rules to the firewall processor 896 of the firewall kernel module 895.

The firewall kernel module 895 processes packets sent from and/or to VMs running on the host 800 in order to determine whether to allow the packets through, drop the packets, etc. As shown, the firewall kernel module 895 includes a firewall processor 895 to perform these functions. The firewall processor 895 receives translated firewall rules for a particular firewall instance from the firewall configuration compiler 892. In some embodiments, these translated firewall rules specify a packet processing pipeline within the firewall that includes flow entries similar to the ACL tables specified by the managed switching element.

In order to receive packets from the managed switching element, the firewall processor 896 of some embodiments connects to a software port abstraction on the integration bridge 850 of the OVS kernel module. Through this port on the integration bridge, the managed switching element sends packets to the firewall and receives packets from the firewall after processing by the firewall (unless the firewall drops the packet). As described, these packets include a slice identifier tag used by the firewall processor 896 to determine which set of compiled packet processing rules to apply to the packet.

The architectural diagram of the distributed firewall and software switching element illustrated in FIG. 8 is one exemplary configuration. One of ordinary skill in the art will recognize that other configurations are possible. For instance, in some embodiments the firewall processor that applies the compiled packet processing rules is located in the user space 821 rather than the kernel 820. In such embodiments, the kernel exposes the network interfaces 810 and 815 for full control by the user space so that the firewall processor can perform its functions in the user space without a loss of speed as compared to the kernel.

III. Packet Processing in Distributed Firewall

The above sections describe the distributed firewall of some embodiments as well as the configuration of such a firewall in order for the firewall to process packets. Once a logical network has been configured, the machines (e.g., virtual machines) on that network will send and receive packets, which requires the use of the packet processing functions of both the managed switching elements and the firewall that reside on the hosts along with the virtual machines.

Figure 9:
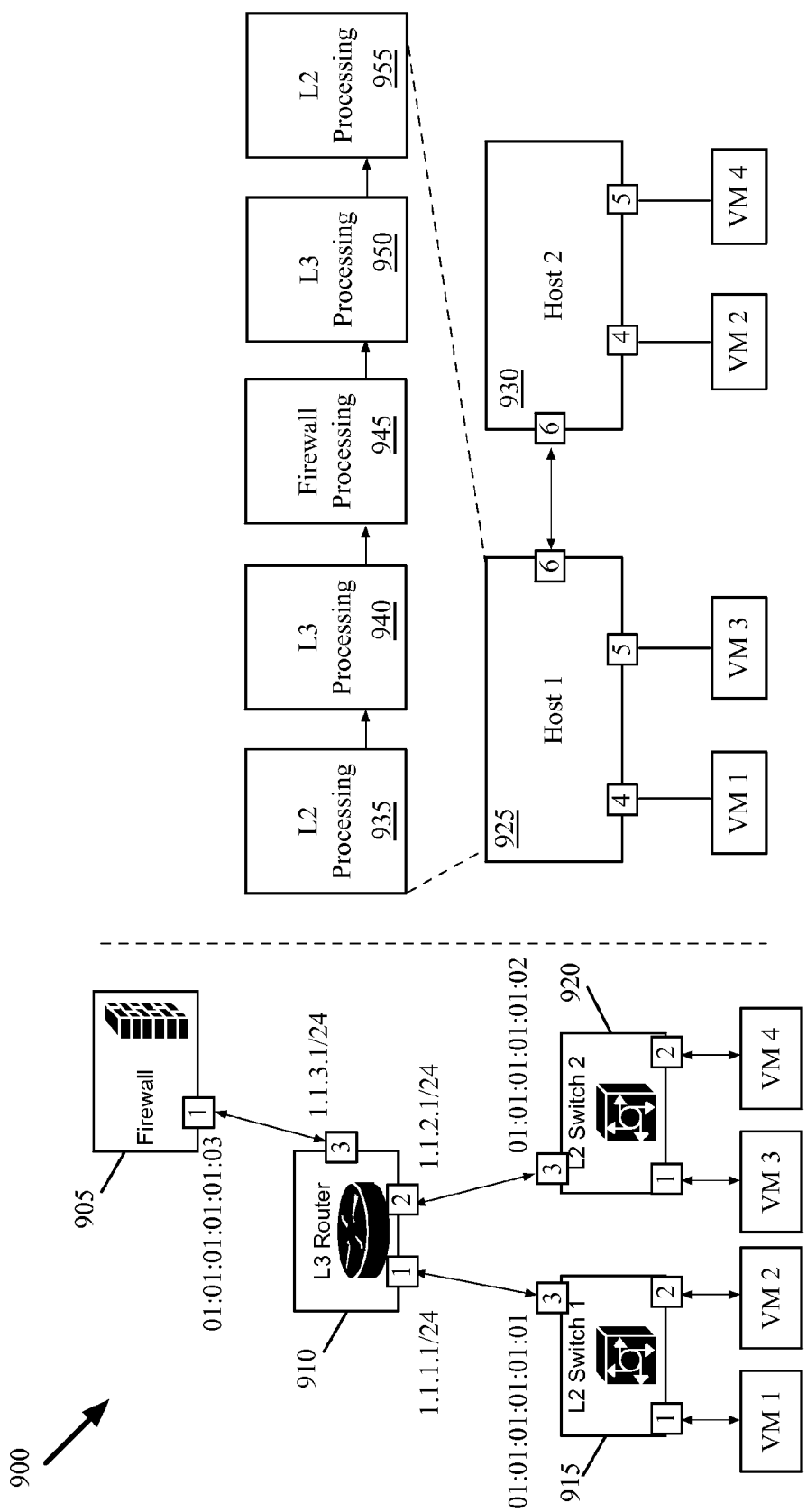
FIGS. 9 and 10 conceptually illustrate the packet processing within two different logical networks for packets sent from a first virtual machine on a first logical L2 switch to a second virtual machine on a second logical L2 switch.
Figure 10:
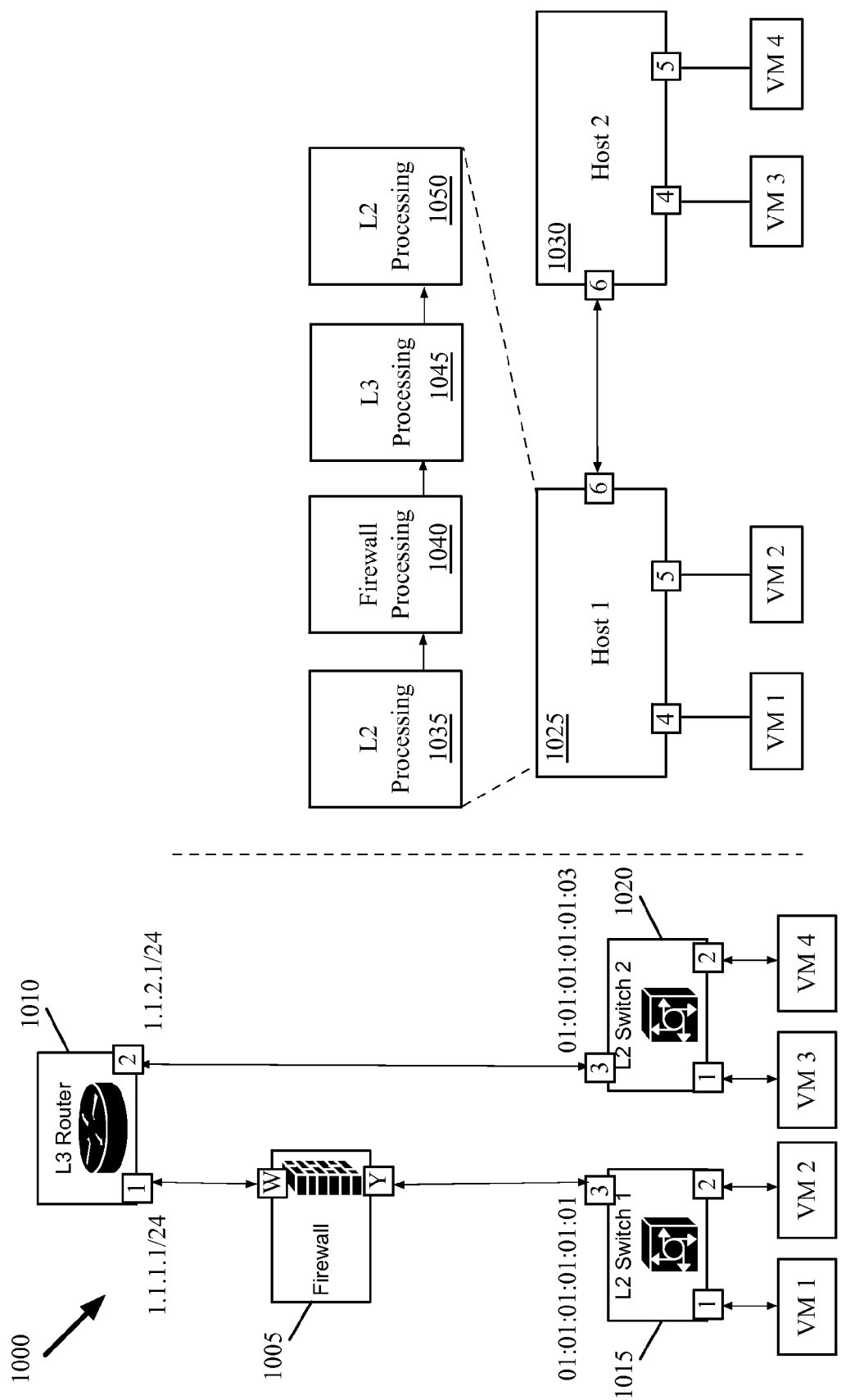

FIGS. 9 and 10 conceptually illustrate the packet processing within two different logical networks for packets sent from a first virtual machine on a first logical L2 switch to a second virtual machine on a second logical L2 switch. FIG. 9, specifically, illustrates a logical network 900 including a logical firewall 905, a logical L3 router 910, and two logical L2 switches 915 and 920. Each of the logical L2 switches 915 and 920 connects two virtual machines, and the two L2 switches are connected by the logical router 910. The firewall 905 also connects to the logical router. As illustrated in the figure, each of the L2 switches has a logical port for each of its virtual machines and a logical port that connects to the logical router. These ports, in some embodiments are assigned MAC addresses. In addition, each of the virtual machines has an assigned MAC address and an assigned IP address.

The logical router 910 has three logical ports, each of which corresponds to a set of IP addresses. In this case, the virtual machines 1 and 2 connected to the L2 switch 915 have IP addresses in the 1.1.1.0/24 subnet while the virtual machines 3 and 4 connected to the L2 switch 920 have IP addresses in the 1.1.2.0/24 subnet. For the purposes of this example, the routing policies at the L3 level state that packets sent from the 1.1.1.0/24 subnet should be sent to the firewall 905. Furthermore, the firewall configuration rules allow packets from this subnet to be sent to the 1.1.2.0/24 subnet, so long as certain conditions are met for the TCP connection between the two addresses.

The right side of the figure illustrates the processing of a packet sent from VM 1 to VM 4. As shown, VM 1 and VM 3 reside on a first host 925, while VM 2 and VM 4 reside on a second host 930. Both of these hosts include a managed switching element that implements each of the logical switching elements of the network 900 (both logical switches as well as the logical router).

In this example, the packet originates from the virtual machine VM 1, which sends the packet to the managed switching element in the first host 925. The managed switching element begins processing the packet by applying the flow entries for the logical switch 915 (i.e., L2 processing 935). The first such entry maps the ingress port of the managed switch on which the packet was received (that corresponds to VM 1) to a logical ingress port (i.e., Port 1) of the switch 915 (which, by default, maps the packet to the logical switch itself). Next, the L2 processing performs any ingress ACL entries that may drop, allow, etc. the packet based on its layer 2 information. Assuming the packet is not dropped, the L2 processing 935 makes a L2 forwarding decision. In this case, the decision forwards the packet to Port 3 of the logical switch, which connects to the logical router. In some embodiments, before beginning the L3 processing 940, the L2 processing includes egress ACL processing.

Next, as shown, the managed switching element performs L3 processing 940 on the packet. The L3 processing includes an L3 ingress ACL (that operates on the layer 3 information of the packet), and then a forwarding decision. In some embodiments, the router 910 as implemented in the managed switching element includes a flow entry to forward packets with a destination IP address in subnet 1.1.2.0/24 to L2 switch 920 via Port 2 of the router. However, doing so would bypass the firewall, given the setup of logical network 900. Accordingly, the L3 router also includes a higher-priority flow entry to route packets with a source IP address in subnet 1.1.1.0/24 and which are received at Port 1 (i.e., have an L3 ingress context of logical Port 1) of the logical router to the firewall 905 via Port 3 of the router. Thus, the forwarding decision made by the L3 processing will route the packet to the logical firewall 905.

At this point, although the firewall is contained within the same physical machine, the packet processing by the managed switch is effectively done, and any logical context stored on the packet is stripped off. Furthermore, the L3 router includes a flow entry for adding the firewall slice identifier to the packet, which it adds before sending the packet via a software port to the firewall.

The packet then reaches the firewall processing 945, performed by the firewall component(s) within the host machine 925. The firewall receives the packet through the previously-mentioned software port, then first identifies which of (potentially) several firewall instances should process the packet. The firewall strips off the slice identifier from the packet, and matches this slice identifier to one of its own internal instance identifiers. The firewall also determines whether the packet matches any of its previously-created state identifiers (for ongoing TCP connections monitored by the firewall) by using packet data (e.g., source and destination IP, etc.) as well as the internal firewall instance ID to find a match in its stored set of states. When the packet matches a state, the firewall processes the packet (e.g., drops, allows, etc.) according to the state. For instance, if the state is an ongoing allowed TCP connection between the IP address of VM 1 and the IP address of VM 4, then the packet will be allowed based on this state. When no state is matched, the firewall applies its firewall processing rules to determine whether to allow the packet, and creates a state for the TCP connection between the IP address of VM 1 and the IP address of VM 4.

Assuming the packet is allowed through the firewall, the firewall sends the packet back to the managed switching element. In some embodiments, the firewall actually sends out a new packet, and the managed switching element treats it as such. The packet is received at the managed switching element through its software port that connects to the firewall, which is mapped during L3 processing 950 to ingress Port 3 of the logical router 910. The managed switching element then performs its usual L3 processing to send the packet to Port 2 based on the destination IP address, which connects to the logical switch 920 (along with any L3 ACL entries). Because the ingress context for the packet is no longer Port 1, the policy routing flow entry to send the packet to the firewall is not matched, and the packet does not end up in a never-ending loop with the firewall.

The managed switching element on host 925 contains flow entries to implement the L2 switch 920 as well, so the L2 processing 955 is also contained in the first host as well. The L2 processing at the switch 920 maps the packet to the port corresponding to VM 4 (Port 2) based on the destination MAC address on the packet, then performs egress context mapping to map this to a physical port (i.e., Port 6 of the host 925) that connects to the host 930 at which VM 4 is located. In addition, the L2 processing 955 adds a tunnel encapsulation to the packet in order to transmit the packet across the physical network to the host 930. Once the packet reaches the second host 930, the managed switching element on the host identifies the L2 egress context, performs any egress ACL processing, and forwards the packet to the destination VM 4.

In the above situation, the firewall is located hanging off of the L3 router, and therefore routing policies not based strictly on packet destination are required in order to send packets to the firewall. FIG. 10, on the other hand conceptually illustrates a logical network 1000 in which the firewall 1005 is located between one of the switches and the L3 router. As such, all packets sent between the logical switch 1015 and the logical router 1010 will be sent through the firewall.

The right side of FIG. 10 again illustrates the processing for a packet sent from VM 1 (connected to logical switch 1015 and located at the first host 1020) to VM 4 (connected to logical switch 1020, and located at the second host 1030). The packet originates from VM 1, which sends the packet to the managed switching element in the first host 1025. The managed switching element begins processing the packet by applying flow entries for the logical switch 1015 (i.e., L2 processing 1035). This processing maps the physical port (Port 4) to the logical port (Port 1) of the logical switch 1015, then makes an L2 forwarding decision to send the packet to the L3 router 1010 via the firewall 1005. Thus, the flow entry specifies to actually send the packet to the firewall module in the host 1025.

In some embodiments with the in-line firewall shown in FIG. 10, the managed switching element creates multiple ports for connecting to the firewall module—one of the ports corresponding to the logical switch 1015 and the other corresponding to the logical router 1010. When the firewall receives a packet via a first one of the ports, it stores instructions to send out a new version of the packet (assuming that the packet is not dropped) via the other of the two ports to the managed switching element. In other embodiments, the same software port is used, but different slicing identifiers are added to the packet depending on whether the packet comes from the L3 router 1010 or the L2 switch 1015.

Thus, the firewall within the host 1025 receives the packet via Port Y, strips off the slicing identifier, and performs the firewall processing 1040. The firewall processing 1040 may contain similar rules and state maintenance as described above with respect to FIG. 9. Assuming the packet is allowed through the firewall, the firewall sends the packet via Port W to the L3 router 1010 in the managed switching element. As in the previous case, the packet sent out from the firewall is essentially a new packet. The managed switching element performs ingress mapping to map the received packet (via the software port from the firewall) to Port 1 of the L3 router 1010. The router performs any ACLs, and L3 forwarding to forward the packet to Port 2 of the router.

The managed switching element then performs the L2 processing on the packet. However, in some cases the managed switching element at host 1025 may not have a flow entry for forwarding the packet based on its destination MAC address (i.e., does not have a flow for matching the MAC address of VM 4. In such a case, the managed switching element 1025 defaults to forwarding the packet to a pool node (not shown), which then performs the logical switching to direct the packet towards the host 1030. This may also occur in the case of FIG. 10, but may be more likely in this situation because the host 1025 does not contain any of the VMs on the logical switch 1020.

Assuming no pool node is involved (because the forwarding tables at the host 1025 include an entry for matching the destination MAC address of the packet), the packet is sent to the second host 1030 via a tunnel. Once the packet reaches the second host 1030, the managed switching element on the host identifies the L2 egress context, performs any egress ACL processing, and sends the packet to the destination VM 4.

As shown, the actual firewall processing is the same irrespective of how the firewall is incorporated into the network (i.e., out-of band as in FIG. 9 or in-line as in FIG. 10), but the flow entries required to send packets to the firewall are different. In the first case, the user specifies routing policies that identify which packets go to the firewall, whereas in the second case the user simply specifies the network topology and flow entries are automatically generated to send the packets on the logical wire between two logical forwarding elements to the firewall. As described, in some embodiments the second situation also requires the creation of two software ports between the managed switching element and the firewall in the host.

IV. Virtual Machine Migration

As mentioned above, the distributed firewall module of some embodiments creates states for each connection (e.g., TCP connection) for which it processes packets, in order to process packets based on these states. In many situations where numerous virtual machines are implemented on a grid of nodes, a virtual machine may be migrated (i.e., moved) from one host machine to a different host machine (e.g., for resource optimization, in order to perform maintenance on the physical node, etc.). In such situations, some embodiments migrate the active states of the distributed firewall that relate to the migrated virtual machine along with the virtual machine.

Figure 11:
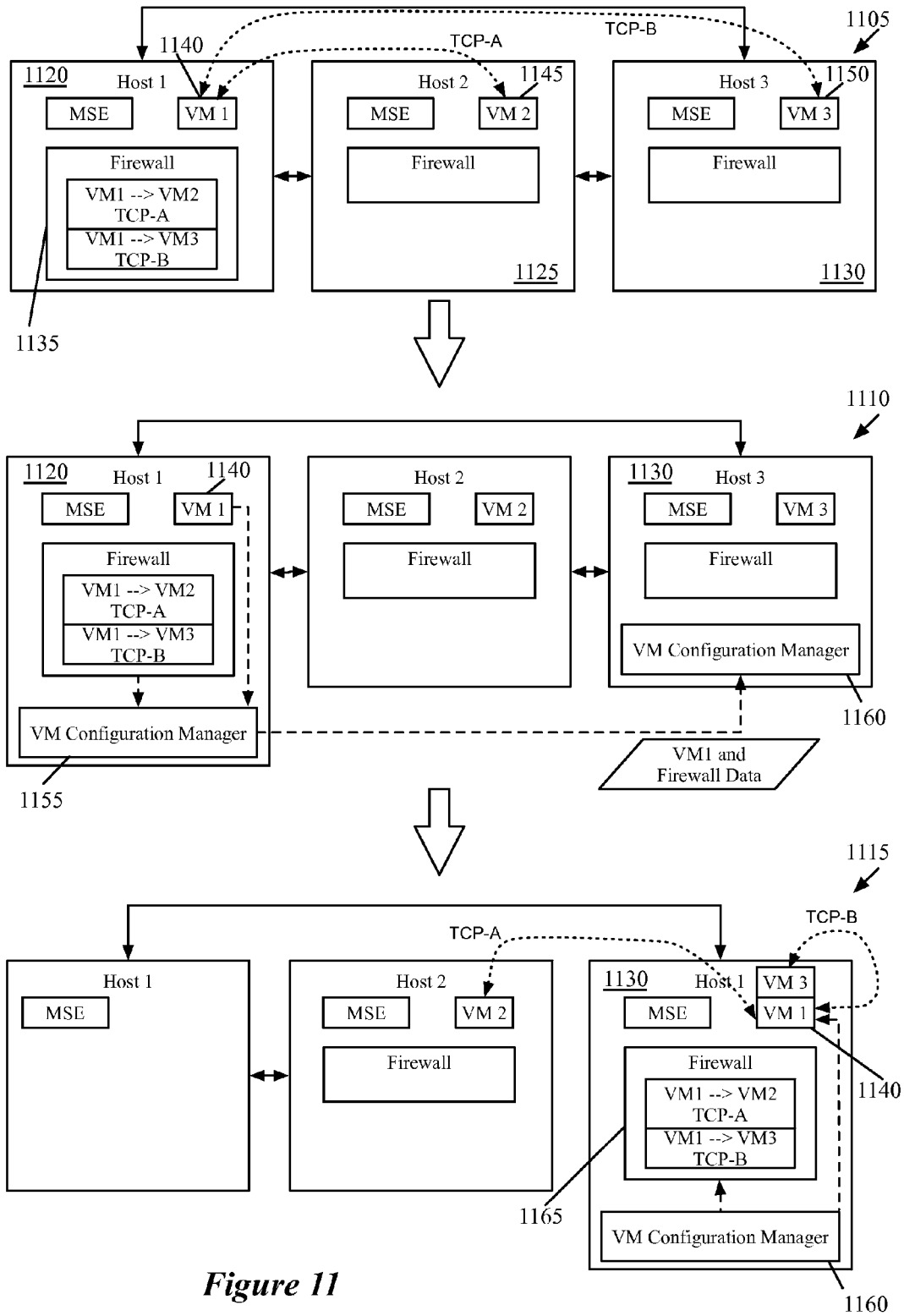
FIG. 11 conceptually illustrates the migration of a virtual machine, and the firewall states associated with the virtual machine, from one host node to another host node.

FIG. 11 conceptually illustrates the migration of a virtual machine, and the firewall states associated with the virtual machine, from one host node to another host node over three stages 1105-1115. As shown, the figure illustrates three host machines 1120-1130 that each host a different virtual machine of a particular managed logical network. Each of the host machines includes a managed switching element and a firewall element. Specifically, the first host 1120 includes a firewall element 1135 and a virtual machine 1140. At the first stage 1120, the virtual machine 1140 has two active TCP connections: a first connection with the virtual machine 1145 on the host 1125, and a second connection with the virtual machine 1150 on the host 1130.

The firewall element 1135 on the first host stores states for each of these ongoing TCP connections (TCP-A and TCP-B). In some embodiments, each of these connections is identified by (1) an identifier matching the state with the particular instance of the firewall, and (2) a connection identifier. The firewall instance ID, in some embodiments, is an internal identifier that maps to a slicing identifier appended by the managed switching element in the host to packets destined for the particular firewall instance. The connection identifier, in some embodiments, uses a set of data unique to the connection to identify the connection. For instance, some embodiments use a 5-tuple of source IP address, destination IP address, source port, destination port, transport protocol (e.g., TCP, UDP, etc.). Thus, the two states stored by the firewall 1135 would have different identifiers due to different destination IP addresses and different destination ports. In some embodiments, the states store statistics, such as number of packets in each direction for a particular connection, packet rate, etc., as well as timing information (e.g., the time of the last packet sent through the connection) in order to determine when to time out.

The second stage 1110 occurs after the host 1120 (e.g., a hypervisor on the host) receives a command to migrate the virtual machine 1140. In some embodiments, a virtual machine configuration manager 1155 on the host 1120 informs the firewall that the virtual machine will be migrated. This VM configuration manager, in some embodiments, is a process running within the hypervisor on the host machine. The configuration manager 1155 retrieves (or is automatically sent) all of the state relating to the particular virtual machine being migrated. In some embodiments, this state is identified by the firewall instance identifier, and all states for that particular instance are sent to the configuration manager.

When multiple virtual machines from the same network that use the same firewall instance are located on the same host, some embodiments retrieve all of the state relating to any of these virtual machines, because the same identifier is used irrespective of to which of the virtual machines the state relates. In other embodiments, the identifier appended to the packet is specific to the source virtual machine (i.e., the physical controller assigns several identifiers to a particular firewall instance, each identifier signifying a specific VM).

In some embodiments, the physical controller assigns both (1) an instance identifier for the particular firewall instance, and (2) a VM specific identifier for each VM that sends packets through the particular firewall instance. The packets sent from the managed switching element in some such embodiments then include the instance identifier in the packet, and the VM specific identifier is provided outside the packet to the firewall instance. In other embodiments, the managed switching element adds a VM specific identifier to the packet (e.g., via the attachment flow entries). Because the managed switching element stores the virtual interface from which a packet is received, it has the ability to identify the source VM for the packet. In both cases, the packets are still sent to the firewall over a single logical port, with the flow entries for the attachment after the logical pipeline is completed handling the necessary slice insertion. As the logical network forwarding rules in the logical lookup tables do not differ based on individual source VMs (logical forwarding is based on destination MAC or IP, unless policy routing rules are defined), the attachment entries must use the stored virtual interface information to add the slice information to the packet.

In some embodiments in which VM specific identifiers are used, only the state relating to the migrating VM is retrieved from the firewall. However, the extraction of state is dependent upon the API of the particular firewall implementation, so in some embodiments the network control system may assign identifiers for each particular VM (e.g., as an additional identifier to the slice ID), but the firewall API may only extract state on a per-slice basis.

The VM configuration manager 1155 stuns the virtual machine 1140 and retrieves (or is sent) any change to the state since the initial retrieval (as the state may change rapidly, with each new packet affecting the states to some extent). As shown, the firewall state and the virtual machine are migrated to the new location. In this example, the host 1130 is the new location for virtual machine 1140. Some embodiments migrate this information through the network control system (e.g., using the network of physical and logical controllers) as a single data blob or as two data blobs. This information, in this example, is sent to the VM configuration manager 1160 on the third host 1130.

The third stage 1115 illustrates the three hosts 1120-1130 after the migration. The host 1135 no longer includes firewall 1135 because no virtual machines belonging to the particular logical network remain on the host. While this indicates that the particular firewall instance is no longer present on the host, in some embodiments the firewall element still remains present. In addition, the VM configuration manager 1160 has installed the virtual machine 1140 on the host 1130, and provided the migrated state to the firewall 1165 on that host. The TCP connections between the VM 1140 and the other VMs have resumed and are monitored by the firewall 1160.

V. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
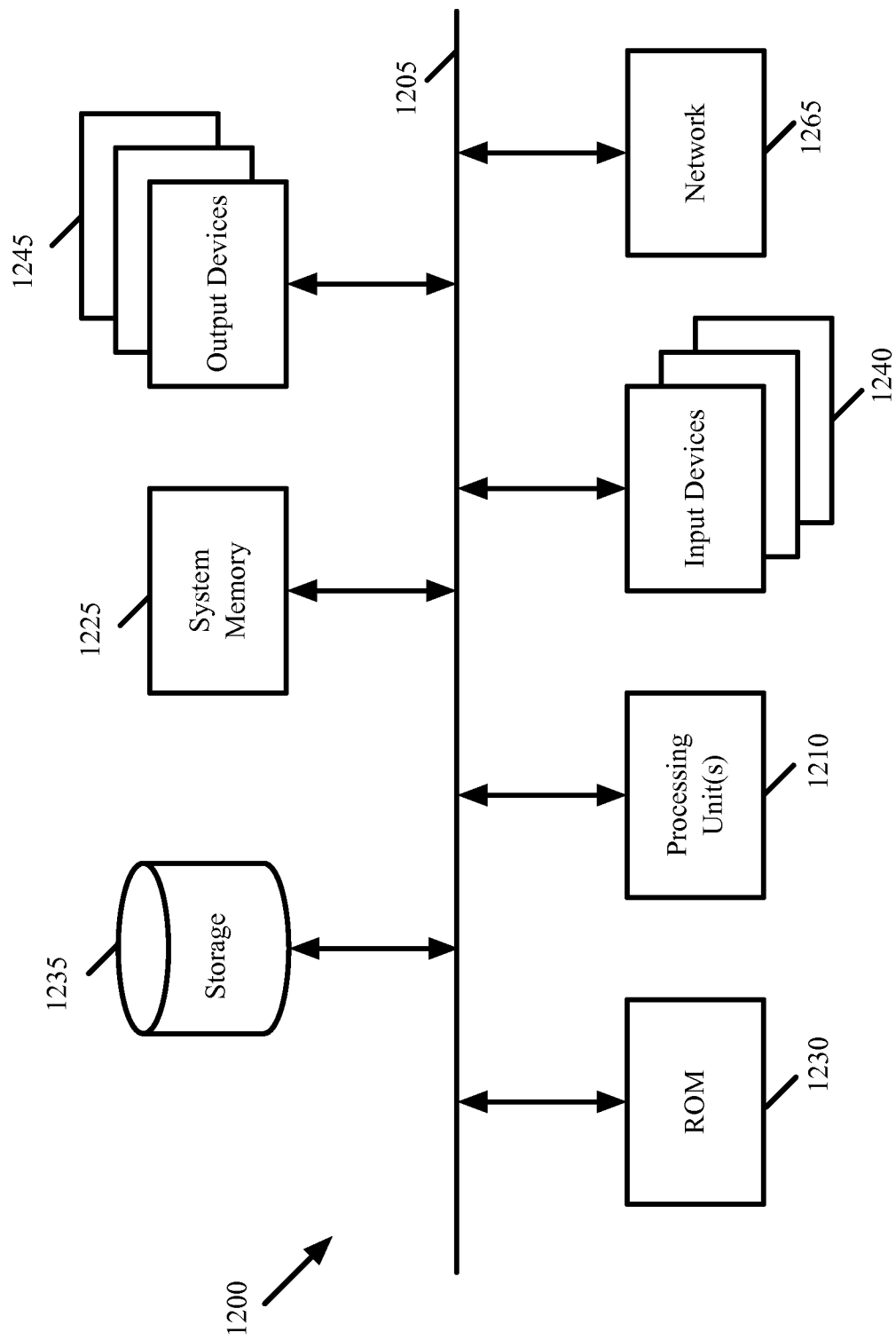
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A machine readable medium storing a distributed firewall application for execution by at least one processing unit of a particular node in a hosting system, the firewall application comprising sets of instructions for:
   receiving a first firewall configuration for a first logical network along with a first identifier, the first logical network connecting a first plurality of machines at least one of which resides on the particular node of the hosting system;
   receiving a second firewall configuration for a second logical network along with a second identifier, the second logical network connecting a second plurality of machines at least one of which resides on the particular node of the hosting system; and
   processing packets, received from a managed switching element located at the node and tagged with the first identifier using the first firewall configuration while processing packets received from the managed switching element and tagged with the second identifier using the second firewall configuration, wherein the managed switching element and the distributed firewall application receive the first and second identifiers from a same network controller.

2. The machine readable medium of claim 1, wherein the particular node is a first node, wherein the first logical network is a distributed, virtualized network that logically connects the first plurality of machines at least a second one of which resides on a second, different node of the hosting system.

3. The machine readable medium of claim 2, wherein the second logical network is a distributed, virtualized network that logically connects the second plurality of machines at least a second one of which resides on a third node of the hosting system.

4. The machine readable medium of claim 1, wherein the network controller assigns the first and second identifiers.

5. The machine readable medium of claim 1, wherein the managed switching element adds one of the first and second identifiers to each packet before sending the packet to the distributed firewall application.

6. The machine readable medium of claim 1, wherein the first logical network connects the first plurality of machines through a set of logical forwarding elements that logically forward packets between the first plurality of machines in the first logical network.

7. The machine readable medium of claim 6, wherein a logical firewall defined by the first firewall configuration connects to at least one of the logical forwarding elements in the set of logical forwarding elements.

8. The machine readable medium of claim 7, wherein the logical forwarding element to which the logical firewall connects is a logical router.

9. The machine readable medium of claim 8, wherein the logical router comprises a set of routing policies that specifies rules for sending packets to the firewall application.

10. The machine readable medium of claim 1, wherein each machine in the first and second plurality of machines is a virtual machine.

11. The machine readable medium of claim 1, wherein the controller is a physical controller that manages the particular node of the hosting system.

12. A method for configuring a distributed firewall application implemented on a particular node in a hosting system, the method comprising:
   receiving a first firewall configuration for a first logical network along with a first identifier, the first logical network connecting a first plurality of machines at least one of which resides on the particular node of the hosting system;
   receiving a second firewall configuration for a second logical network along with a second identifier, the second logical network connecting a second plurality of machines at least one of which resides on the particular node of the hosting system; and
   processing packets, received from a managed switching element located at the node and tagged with the first identifier using the first firewall configuration while processing packets received from the managed switching element and tagged with the second identifier using the second firewall configuration, wherein the managed switching element and the distributed firewall application receive the first and second identifiers from a same network controller.

13. The method of claim 12, wherein the particular node is a first node, wherein the first logical network is a distributed, virtualized network that logically connects the first plurality of machines at least a second one of which resides on a second, different node of the hosting system.

14. The method of claim 13, wherein the second logical network is a distributed, virtualized network that logically connects the second plurality of machines at least a second one of which resides on a third node of the hosting system.

15. The method of claim 12, wherein the network controller assigns the first and second identifiers.

16. The method of claim 12, wherein the managed switching element adds one of the first and second identifiers to each packet before sending the packet to the distributed firewall application.

17. The method of claim 12, wherein the first logical network connects the first plurality of machines through a set of logical forwarding elements that logically forward packets between the first plurality of machines in the first logical network.

18. The method of claim 17, wherein a logical firewall defined by the first firewall configuration connects to at least one of the logical forwarding elements in the set of logical forwarding elements.

19. The method of claim 18, wherein the logical forwarding element to which the logical firewall connects is a logical router.

20. The method of claim 19, wherein the logical router comprises a set of routing policies that specifies rules for sending packets to the firewall application.

21. The method of claim 12, wherein each machine in the first and second plurality of machines is a virtual machine.

22. The method of claim 12, wherein the controller is a physical controller that manages the particular node of the hosting system.

* * * * *